Dec. 1, 1953   C. A. ROBINSON   2,660,740
LASTING MACHINE
Filed Oct. 12, 1950   9 Sheets-Sheet 1

Inventor
Charles A. Robinson
By his Attorney

Dec. 1, 1953  C. A. ROBINSON  2,660,740
LASTING MACHINE
Filed Oct. 12, 1950  9 Sheets-Sheet 2
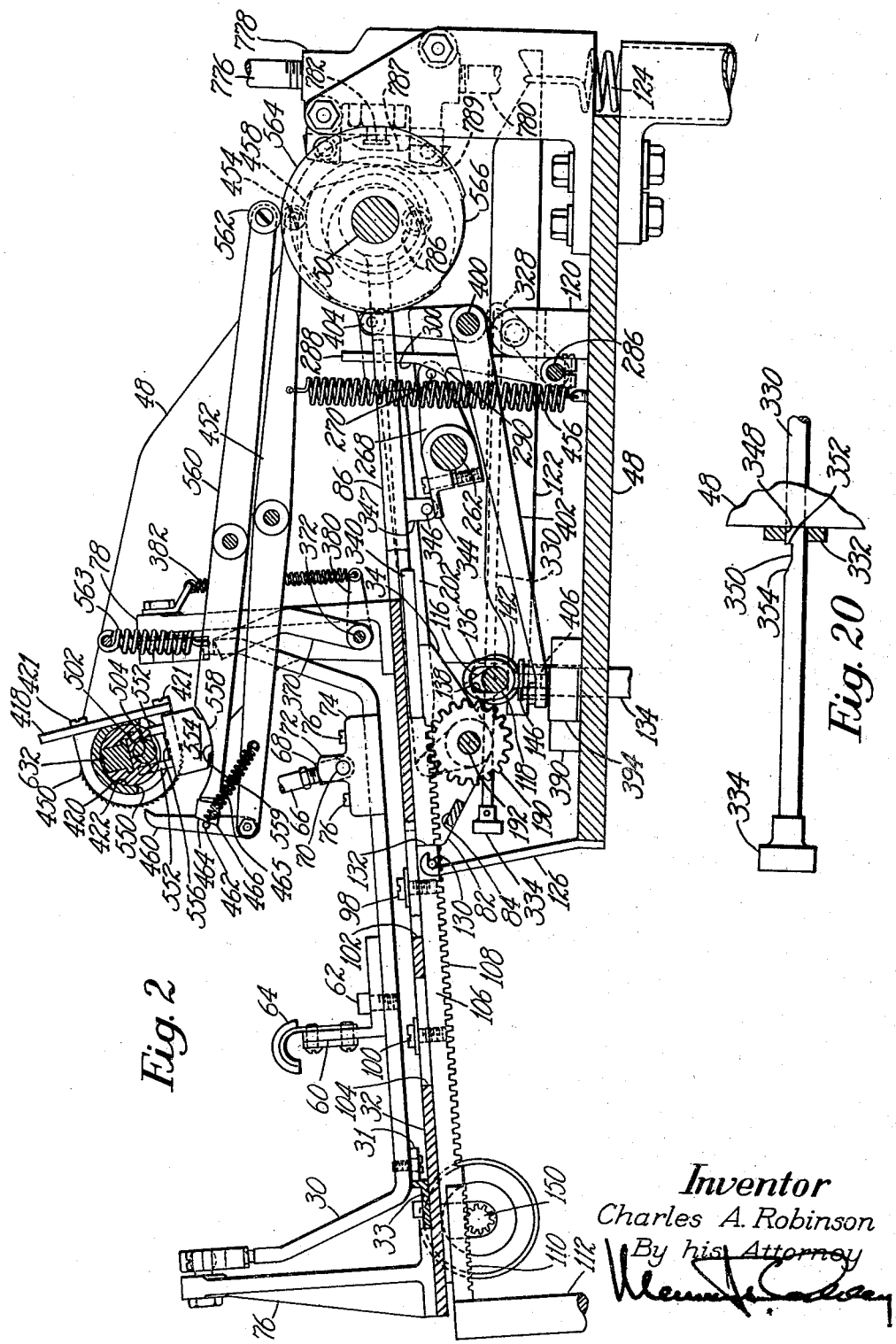
Inventor
Charles A. Robinson
By his Attorney

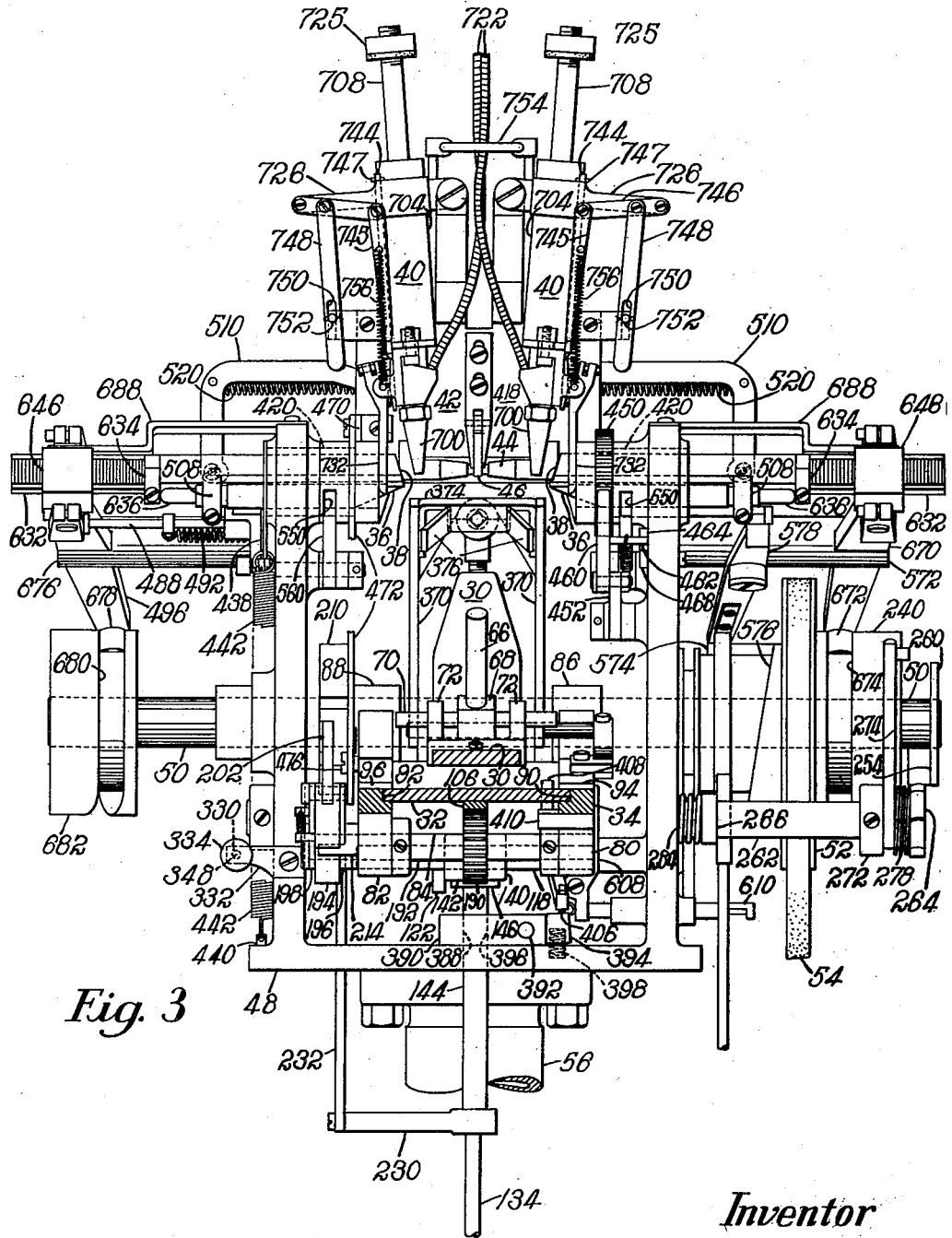

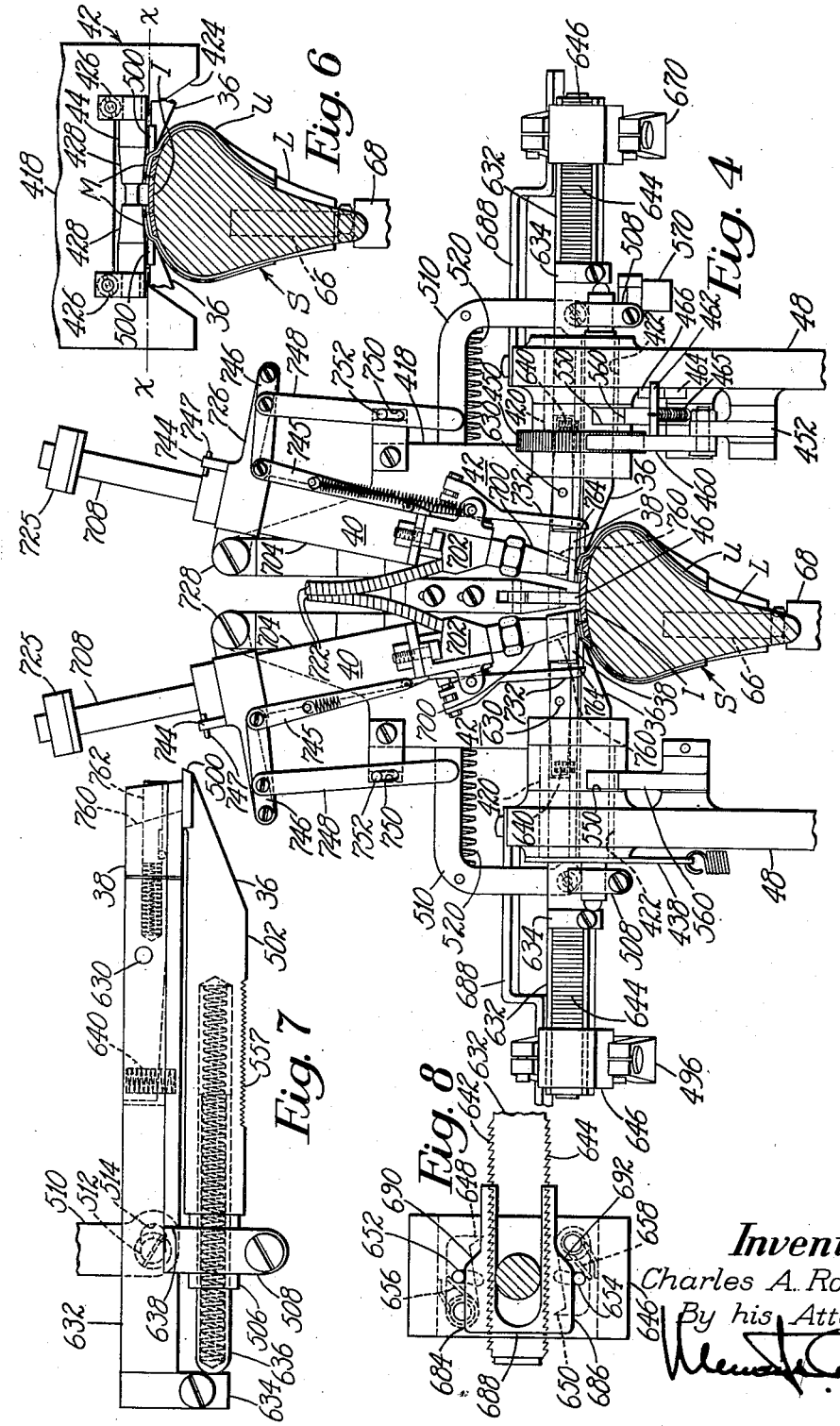

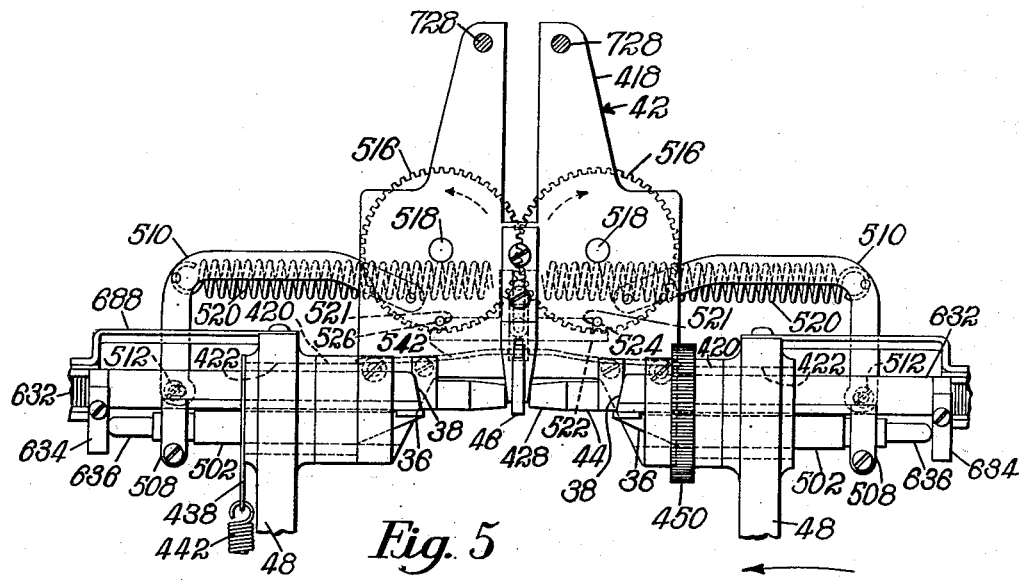
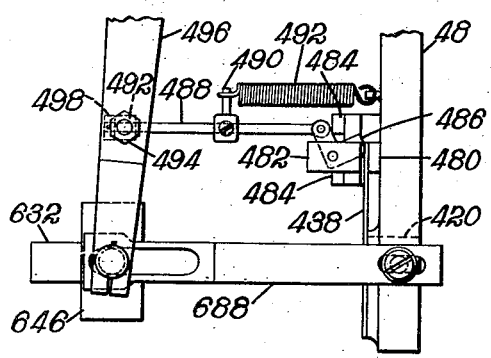
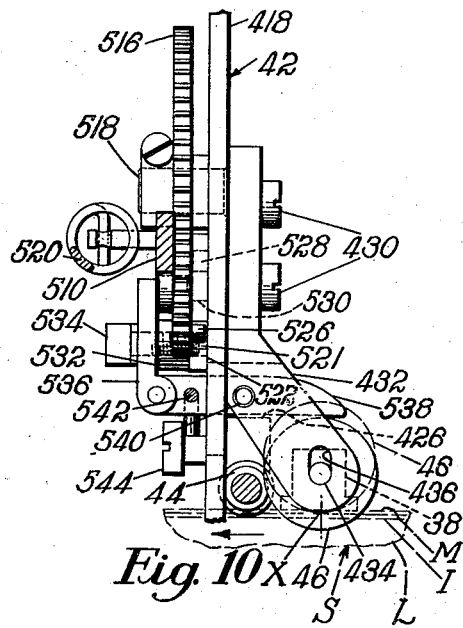

Dec. 1, 1953  C. A. ROBINSON  2,660,740
LASTING MACHINE
Filed Oct. 12, 1950  9 Sheets-Sheet 6

Inventor
Charles A. Robinson
By his Attorney

Dec. 1, 1953   C. A. ROBINSON   2,660,740
LASTING MACHINE
Filed Oct. 12, 1950   9 Sheets-Sheet 7
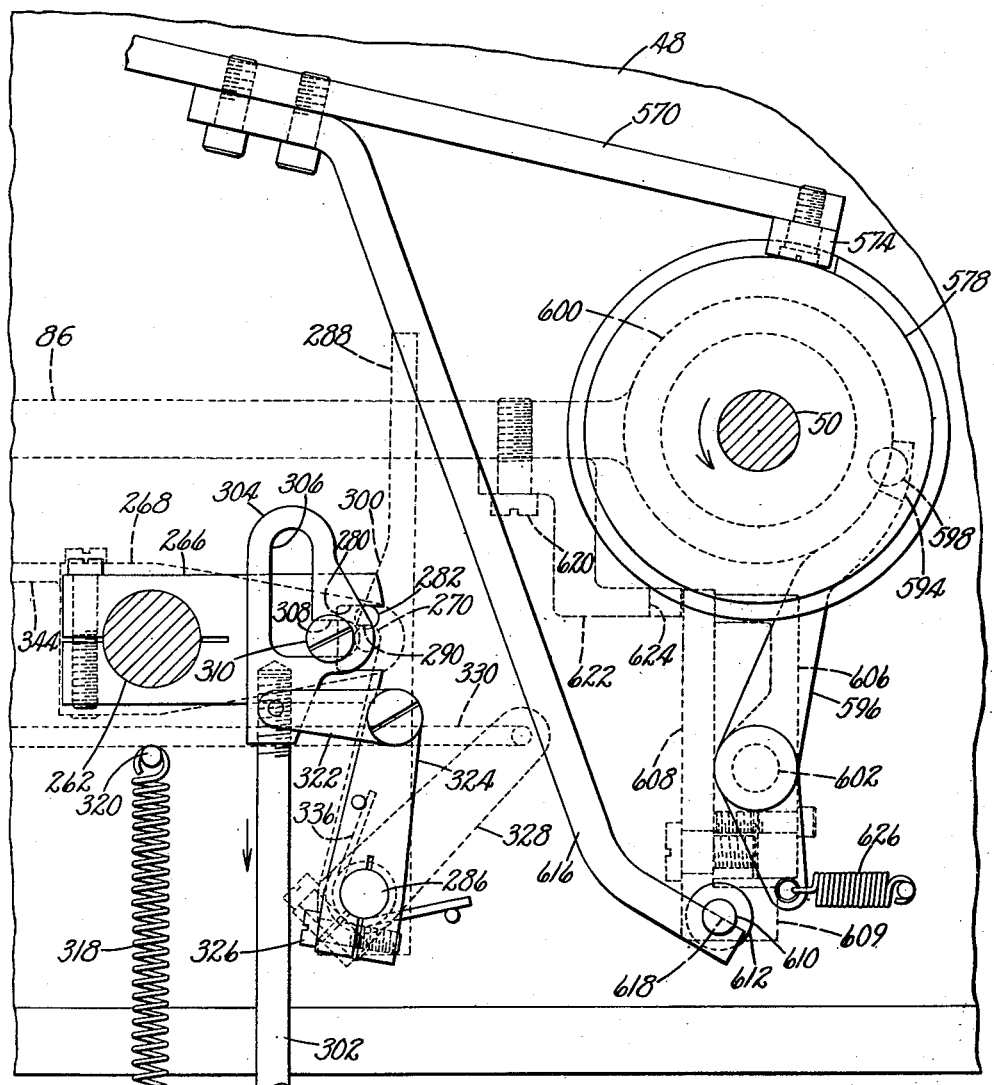
Fig. 13
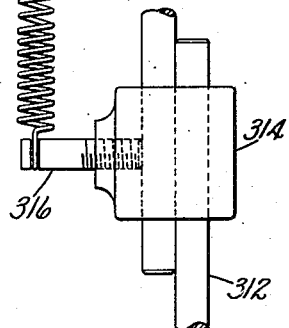
*Inventor*
Charles A. Robinson
By his Attorney Dec. 1, 1953  C. A. ROBINSON  2,660,740
LASTING MACHINE
Filed Oct. 12, 1950  9 Sheets-Sheet 8

Inventor
Charles A. Robinson
By his Attorney

Inventor
Charles A. Robinson
By his Attorney

UNITED STATES PATENT OFFICE 2,660,740

LASTING MACHINE

Charles A. Robinson, Salem, Mass., assignor to United Shoe Machinery Corporation, Flemington, N. J., a corporation of New Jersey Application October 12, 1950, Serial No. 189,811

49 Claims. (Cl. 12—12.1)

This invention relates to lasting machines and has for its principal object the provision of a novel and improved machine for operating along the opposite sides of a shoe, successively, in different locations as the shoe is supported and moved along, relatively to lasting devices, which is not only capable of handling shoes of various sizes and styles but also of producing an effective and positive lasting action at a high rate of output and with a minimum amount of operator skill and labor. While not necessarily limited to such use, the machine of this invention is intended, primarily, for lasting along the opposite sides of the bottom of a shoe, from breastline to ball portion. Thus, when presented to the machine, the shoes will have been breastline lasted and ball pulled, i. e., the counter, lining and upper will have been tacked to the insole, adjacent to the breastline, and the upper and lining will have been tensioned over the last and secured to the insole, in the vicinity of the ball portion of the shoe.

With the above-mentioned object in view, the machine of this invention has a pair of lasting devices for operating on the opposite sides of a shoe and a support that is movable to feed a shoe thereon, relatively to the lasting devices. More particularly, the lasting devices each includes an edge gage for engaging the marginal edge of the shoe bottom, a wiper for laying the lasting margin of the upper materials in over, and for pressing it against, the bottom of the shoe, and a device for inserting fastenings in the overlasted margin of the upper materials, while the shoe support comprises a table mounted for movement upwardly toward and downwardly away from the lasting devices, to present a shoe in operative position, at the beginning of the lasting operation, and to withdraw it from such operating position, at the conclusion of the lasting operation, and a carriage slidable on the table, by means of feed mechanism, for moving the shoe relatively to the lasting devices, during the lasting operation. The feed mechanism includes a member associated with the carriage for discontinuing movements of the support by the feed mechanism and the operation of the lasting devices, which, in accordance with a feature of the invention, is adjustable relatively to the carriage to accommodate shoes of different sizes and styles. The carriage has a heel pin and a toe rest, for supporting a shoe on its last; the heel pin being movable in a direction extending laterally of the shoe to permit centering of the heel end of the shoe by the operator as well as by a heel-engaging abutment which, in accordance with a further feature of the invention, is arranged to be operated by movement of the carriage to aline the breastline of the shoe with the operating devices, before the machine is started. The table is urged upwardly, to hold a shoe on the carriage yieldingly in operative position, by means of a spring, during the feeding movements of the carriage and, in accordance with another feature of the invention, means are provided for locking the table against downward movement when the lasting devices are operating. For moving the table downwardly, to withdraw the shoe from operative position, a treadle rod is associated with the treadle and this treadle rod is arranged to operate mechanism for connecting and disconnecting the feed mechanism from the carriage.

As herein illustrated, and in accordance with other features of the invention, the edge gages, wipers and tacking devices are carried on a head member which is mounted for pivotal movement about an axis extending transversely across the bottom of a shoe on the carriage, and mechanisms, operating in time relation to the feeding movements of the carriage, are provided for swinging the head about this axis, to level operating surfaces on the wipers with respect to the bottom of the shoe, during each feeding movement of the carriage, and for locking the head member against movement, when the wipers are being operated. More particularly, this head member carries two rolls against which the bottom of the shoe being lasted is held, yieldingly, during the operation of the machine, the pivotal axis of the head passing through the point of contact of one of these rolls, and the head member is swung about this axis, and the point of contact of that roll, to bring the other roll into contact with the shoe bottom and thereby level the operating surfaces of the wipers. In addition, the edge gages are mounted for movement toward each other and into engagement with the opposite sides of the shoe by means including an equalizing mechanism and a spring which holds the edge gages against the opposite sides of the shoe, during the feeding movements of the carriage and means, operating in time relation to the action of the lasting devices, are provided for locking these edge gages against movement so as to hold the shoe against lateral displacement. A latch which holds the edge gages away from the shoe is arranged to be tripped, to release the edge gages, in response to the engagement of the shoe bottom with one of the rolls on the head member, when the table is moved upwardly to present the shoe in operative position, and mechanism is provided for automatically withdrawing the edge gages to latched position, when the table is moved downwardly to withdraw the shoe from operative position, at the conclusion of the lasting operation.

In accordance with further features of the invention, the wipers of the herein illustrated machine are pivoted on the inner ends of wiper slides which are mounted for movement toward the opposite sides of a shoe on the carriage and these slides are arranged to be carried inwardly by the edge gages, as they move into engagement with the opposite sides of the shoe. Thereafter, during each operating cycle of the machine, these wiper slides are reciprocated, by means of power-operated members, through strokes of predetermined linear extent, to cause the wipers to lay the lasting margin of the upper materials in over, and to press it against, the bottom of the shoe at the opposite sides of the shoe. More particularly, the wiper slides are actuated by these power-operated members through clutch mechanisms arranged to be automatically connected to, and disconnected from, the slides in such a manner that the reciprocating movements of these slides are the same, regardless of the positions to which they are moved by the edge gages. As the wipers are thus moved inwardly over the bottom of the shoe, they swing about their pivotal connections on the slides, against the resistance of springs, thereby accommodating themselves to the contour of the shoe bottom while exerting yielding pressure on the upper materials. Prior to their engagement with the upper materials, at the opposite sides of the shoe, the wipers are held in contact with the edge gages, by means of the aforementioned springs, and inasmuch as the edge gages contact the opposite sides of the shoe adjacent to the bottom surface of the insole, a sharp and well-defined feather line is produced. During the operation of the wipers and prior to the locking of the edge gages, additional spring means, interposed between the wiper slides and the edge gages, are compressed, thereby increasing the pressure of the edge gages on the shoe as permitted by lost motion connections provided between the edge gages and their equalizing mechanism. Thus, if the shoe bottom is not accurately centered, the shoe will be shifted to centered position so that the edge gages bear with equal pressure on the opposite sides of the shoe, as the result of the additional force exerted on the shoe by one or the other of the edge gages.

The fastener-inserting devices include a pair of tack nozzles which, in accordance with still other features of the invention, are mounted for movement inwardly over the shoe bottom, at the opposite sides of the shoe, by means of spring-pressed plungers carried by the wipers, and for limiting the inward movement of these nozzles, to determine the position of the tacks with respect to the edge of the shoe bottom, these nozzles are provided with stop fingers arranged to engage abutments formed on the edge gages. Because of the extra thickness of the upper, counter and lining in the vicinity of the breastline, and the necessity of leaving a clearance space for a shank stiffener, adjacent to the relatively narrower ball portion of the shoe bottom, it is desirable that the tacks be located progressively closer to the edge of the shoe bottom, as the lasting operation proceeds from breastline to ball portion. For this purpose, means are also provided for automatically varying the positions of the aforementioned stop fingers in accordance with the locations of the edge gages, when in engagement with the opposite sides of the shoe. The tack nozzles are provided with driver passages through which tack drivers operate to drive the tacks. These drivers are actuated by means of pistons, slidable in cylinders, and a cam-operated valve is arranged to admit air under pressure to these cylinders, at a predetermined point in each operating cycle of the machine. A tack separator adapted to separate two tacks at a time is provided and tack-feeding conduits are arranged to convey the separated tacks from this separator to the driver passages in the nozzles. To facilitate the feeding of the tacks through these conduits, the aforementioned cam-operated valve is also connected to these conduits, adjacent to the separator, so that air under pressure is admitted, simultaneously, to the cylinders and to the tack conveying conduits.

The above and other objects and features of the invention will appear in the following detailed description of the preferred embodiment thereof, illustrated in the accompanying drawings, and will be pointed out in the claims.

In the drawings,

Fig. 2 is a view in side elevation of the machine shown in Fig. 1, at an enlarged scale and with certain parts shown in vertical section;

Fig. 3 is a view in front elevation of the machine shown in Fig. 1 with certain parts in section;

Fig. 4 is a view similar to that of Fig. 3 with certain parts omitted and showing the machine operating on a shoe;

Fig. 5 is a view in front elevation similar to that of Fig. 4 but with certain other parts omitted;

Fig. 6 is a view in front elevation of a portion of the machine;

Fig. 7 is a view in front elevation of one of the operating elements of the machine;

Fig. 8 is a plan view of a part of the operating mechanism of the machine;

Fig. 9 is a plan view of another part of the operating mechanism of the machine;

Fig. 10 is a view in side elevation of a portion of the machine;

Fig. 13 is a view in side elevation and at an enlarged scale of parts of the control mechanism shown in Fig. 12;

Fig. 20 is a view in side elevation of a part of the machine; and

Figure 1:
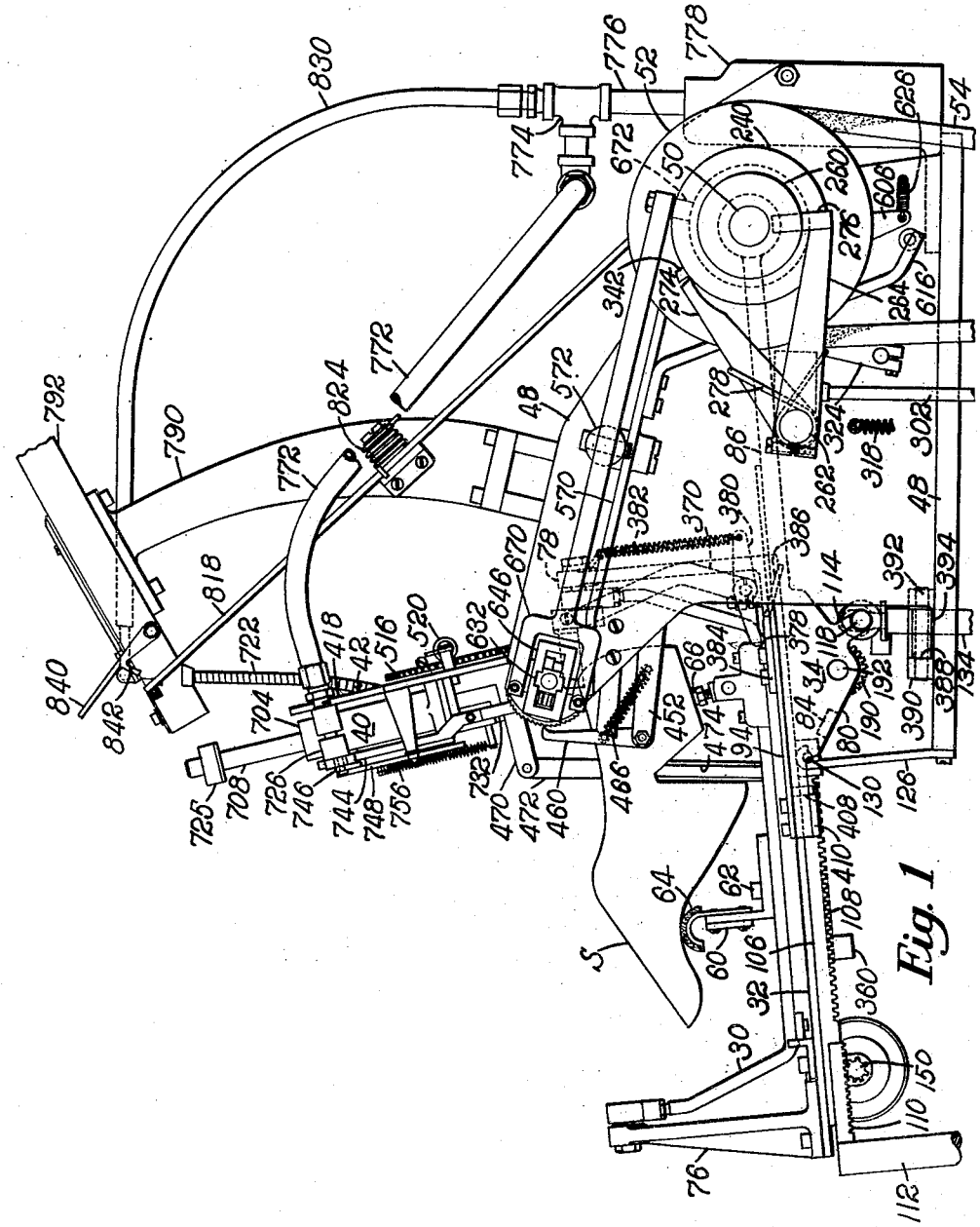
Fig. 1 is a view in side elevation of a machine embodying the features of the invention.

Referring to these drawings, and particularly Figs. 1, 3 and 4 thereof, the herein illustrated machine is adapted to operate progressively along the opposite sides of a shoe S, herein shown as comprising an upper U, assembled on a last L with an insole I, as the shoe is supported in operative position and fed along, step by step, and relatively to the operating elements of the machine. Thus, the machine is provided with a shoe support, including a cradle 30, mounted on a carriage 32 which is slidable on a table 34, to effect a feeding movement of the shoe, Fig. 1, and operating elements comprising a pair of edge gages 36, 36, a pair of wipers 38, 38, and a pair of tacking devices 40, 40, Figs. 3 and 4. These operating elements are supported on a head member 42 which is mounted for pivotal movement, about an axis extending transversely across the bottom of the shoe being lasted, for a purpose that will appear below, and carried by this head member are spaced rollers 44 and 46 against which the bottom of the shoe is yieldingly held during the operation of the machine, Fig. 6. The shoe support and head member are associated with a frame construction, indicated by the reference character 48, and the several operating elements, mentioned above, as well as mechanism for effecting the feeding movement of the shoe, are operated by mechanism including a main drive shaft 50 which is journaled in this frame construction, Figs. 3 and 19. As will appear below, power is supplied to this shaft by means including a pulley 52 and a belt 54, Fig. 1, which is connected to a power source, not shown. The frame construction 48 is supported on the upper end of a column 56 of suitable height, Fig. 3.

*Shoe support and feeding mechanism*

Secured to the cradle 30 by means of a screw 62 is a toe rest 60 having a rubber shoe-engaging pad 64, Figs. 1 and 2. Also mounted on the cradle is a heel pin 66 which is threaded into, and projects upwardly from, a block 68, formed integrally with a cross shaft 70, Fig. 3. This shaft is slidably received in two upstanding ears 72, 72 on a block 74 that is secured to the cradle 30 by means of screws 76, 76, Fig. 2. The cradle 30 is pivotally mounted on the carriage 32, for rocking movement, about an axis extending generally lengthwise of a shoe supported thereon, by means of brackets 76 and 78, secured to the carriage. Mounted on the lower side of the cradle 30 is a thrust roller 31 which rides along a thrust abutment 33 carried by the carriage 32, Fig. 2, during rocking movement of the cradle.

Figure 19:
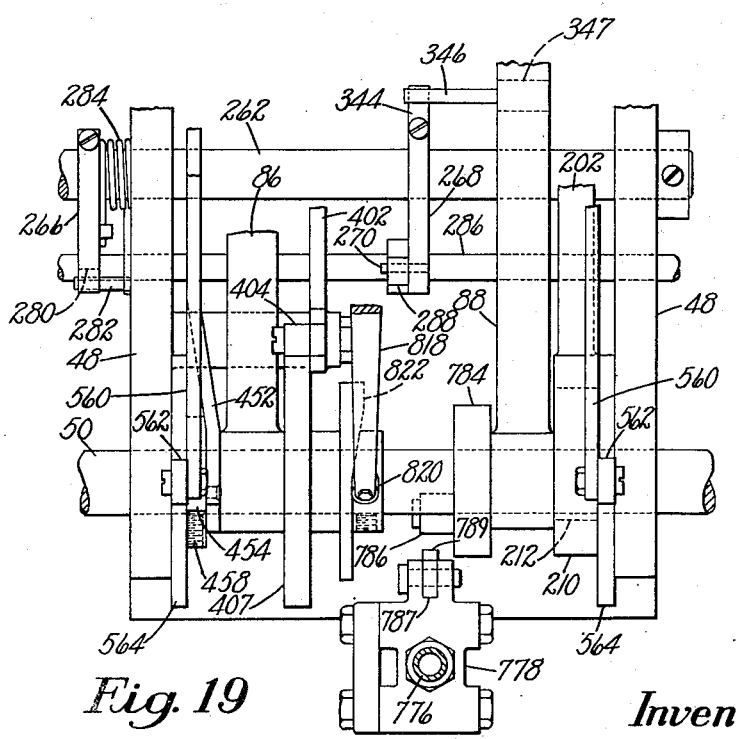
Fig. 19 is a plan view of a portion of the machine showing the main drive shaft and operating cams carried thereby.

The table 34 comprises two side portions 80, 82, joined by a connecting web 84, Fig. 3, and two rearwardly extending arms 86, 88 which are journaled on the main drive shaft 50, Fig. 19. The carriage 32 is received in guideways 90, 92 formed in the upper surfaces of the side portions of the table, and is held in place in these guideways by means of cover plates 94, 96, Fig. 3. Connected to the lower side of the carriage 32, by means of screws 98, 100 which are slidable along slots 102, 104 in the carriage, is a rack bar 106 which is provided with two series of rack teeth 108 and 110 and carries a handle 112, Fig. 2. Extending downwardly and rearwardly from the side portions 80, 82 of the table 34 are two ears 114, 116 which are joined by a cross shaft 118. Pivotally mounted on a bracket 120, associated with the frame construction 48, is a lever 122 one end of which extends beneath the cross shaft 118, Figs. 2 and 3. Connected to the other end of this lever is a coil spring 124 which tends to rotate the lever 122 in a clockwise direction and thus elevate the table 34, carriage 32 and cradle 30. Such upward movement of the table is, however, at times prevented by a hook 126 which engages a pin 130 that projects from a block 132, secured to the carriage 32. When this hook is disengaged from the pin, by first depressing the table 34 and then moving the carriage 32 to the right, Fig. 2, the table 34, carriage 32 and cradle 30 will be yieldingly elevated by the spring 124 to bring the bottom of a shoe, supported on the cradle 30, into engagement with the rollers 44 and 46 on the head member 42. For thus depressing the table 34, a treadle rod 134 is connected at its lower end to a foot treadle, not shown, and at its upper end has a head portion 136 in which there is a slot 138, Figs. 2 and 11. The head portion of the treadle rod is positioned between two collars 140, 142 on the cross shaft 118 which passes through the slot 138 in the head 136. Near its upper end, the treadle rod has a portion 144 of square cross section and resting on the upper end of this square portion of the treadle rod is a washer 146, Figs. 3 and 11. A spring associated with the treadle, not shown, tends to elevate the treadle rod 134 so that the lower end of the slot 138 is held in engagement with the cross shaft 118, when the table 34 is retained in its lowered position by the hook 126, see Fig. 2. However, by moving the treadle rod 134 downwardly, thus taking up the lost motion afforded by the slot 138, the table 34 may be depressed. Then, after the carriage 32 has been moved a short distance to the right, Fig. 2, the treadle rod may be permitted to rise so that the table 34, carriage 32 and cradle 30 will be elevated by the spring 124 and a shoe on the cradle moved up against the rollers 44, 46 on the head member 42.

The rack bar 106, which is movable relatively to the carriage 32 by reason of the screws 98, 100 and slots 102, 104, is normally fixed with respect to the carriage. The rack teeth 110 are in mesh with a pinion 150, Figs. 1 and 2, which is formed integrally with one end of a shaft 152, Fig. 18. This shaft is journaled in a bore 154 in a bracket 156 that is secured to the lower side of the slide 32. Connected to the opposite end of this shaft, by means of a clamp nut 158, is a hand knob 160 which has a recessed hub 162 and a radial flange 164. Pinned to this shaft, adjacent to the hand knob 160 and within its recessed hub, is the hub 166 of a disk 168 on one side of which there are serrations 170. Interposed between the flange 164 of the hand knob 160 and the opposite side of the disk 168 is the radial flange 172 of a drum 174. A coil spring 176, received within the recessed hub of the hand knob, urges the flange 172 of the drum 174 into frictional engagement with the latter side of the disk 168. The bracket 156 is provided, at one end, with an enlarged portion 178, on which there are serrations 180, and a coil spring 182, interposed between the opposite end of this bracket and the pinion 150, tends to hold the serrations 170 and 180 in engagement, thereby locking the rack bar 106 against movement relatively to the carriage 32. However, when the hand knob is moved to the left, Fig. 18, against the resistance of spring 182, the serrations 170 will be withdrawn from engagement with the serrations 180 and relative movement, between the rack bar 106 and the slide 32, may be effected by rotation of the hand knob 160, for a purpose that will presently appear.

The rack teeth 108 of the rack bar 106 are in mesh with a gear 190 which is fast on a shaft 192, journaled in the side portions 80, 82 of the table 34, Figs. 1, 2 and 3. On one end of this shaft, which extends beyond the side portion 82 of the table, there is secured a ratchet wheel 194, Figs. 3 and 11, and rotatably mounted on this end of the shaft are two arms 196, 198, one on each side of the ratchet wheel. Pivotally mounted on these arms is a pawl 200, to which there is connected a link 202, Fig. 11, and which is urged yieldingly into engagement with the teeth of the ratchet wheel by means of a coil spring 204. A locking pawl 206, mounted on the side portion 82 of the table 34, is urged into engagement with the teeth of the ratchet wheel by a spring 208. The link 202 is connected to an eccentric strap 210 which surrounds an eccentric 212 fast on the main drive shaft 50, Fig. 19. Also journaled on the shaft 192 and located between the side portion 82 and the arm 196, Fig. 3, is a release lever 214 which carries two pins 216, 218 that are in alinement, respectively, with the pawls 200, 206, Fig. 11. Secured to the treadle rod 134 is a laterally extending arm 230 which is connected to the release lever 214 by means of a link 232, Figs. 3 and 11. The amount of lost motion of the treadle rod 134, permitted by the slot 138, is sufficient to cause the latch release lever 214 to be rotated and the pawls 200 and 206 disengaged from the ratchet wheel 194, when the upper end of the slot is brought into engagement with the cross shaft 118. Hence, when the treadle rod 134 is moved downwardly, to depress the table 34, the carriage 32 may be moved relatively to the table 34, by means of the handle 112, to release the table for upward movement by the spring 124. Now, when the operator gradually allows the treadle rod to rise, as the table is moved upwardly by the spring 124, while causing the upper end of the slot 138 to remain in engagement with the cross shaft 118, the carriage may be moved along, relatively to the table, to position the shoe in a lengthwise direction relatively to the operated elements carried by the head 42. Then, as the treadle rod 134 is fully released, to allow the spring 124 to complete the elevation of the table and bring the bottom of a shoe supported on the cradle 30 into engagement with the rollers 44 and 46, the treadle rod will be moved upwardly by its spring, so that the lower end of the slot rests against the shaft 118, and the pawls 200 and 206 thus returned to operative engagement with the ratchet wheel 194.

Figure 11:
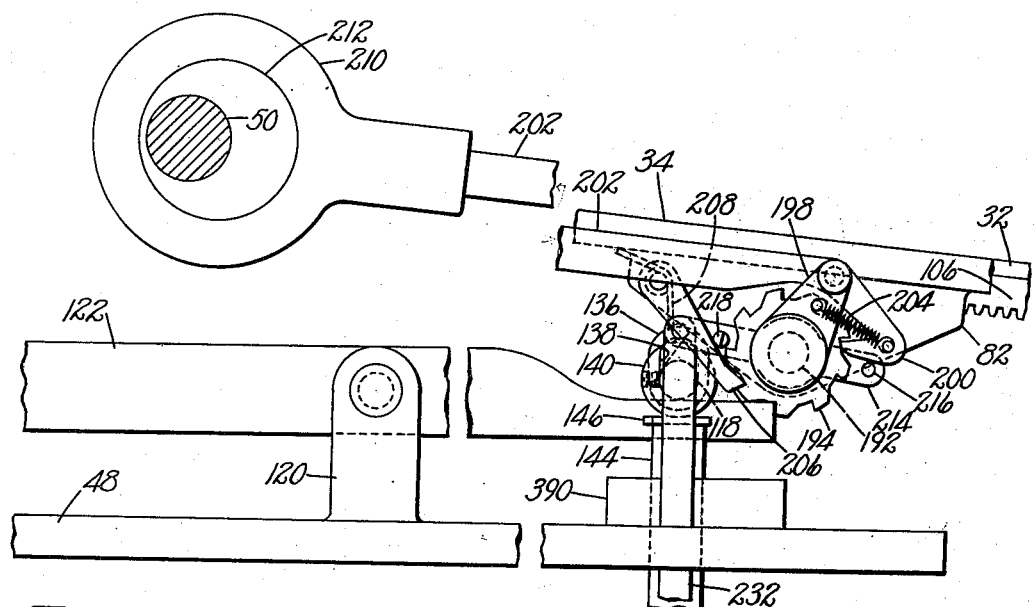
Fig. 11 is a view in side elevation of a portion of the shoe-feeding mechanism.
Figure 21:
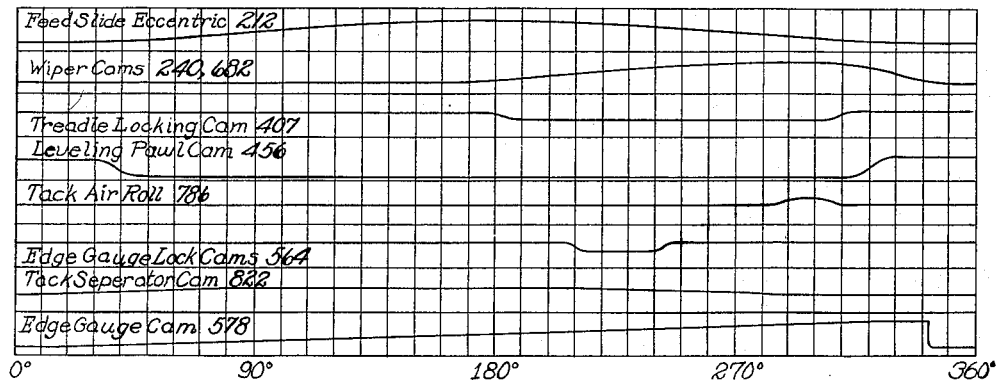
Fig. 21 is a cam chart.

The feeding increments are imparted to the slide 32 by the actions of the eccentric 212, link 202, pawls 200, 206, ratchet wheel 194, gear 190 and rack teeth 108 on the rack bar 106 when the machine is in operation and the main drive shaft 50 connected to the pulley 52 by means of clutch mechanism to be described below. Referring to Figs. 11 and 21, each time the link 202 is moved to the left by the eccentric 212, the ratchet wheel 194 will be rotated one tooth by pawl 200 and, when the link is moved to the right, the ratchet wheel will be held against rotation reversely by the locking pawl 206. These angular movements of the ratchet wheel are transmitted to the gear 190 and thence to the rack bar 106 which, as explained above, is normally connected to the carriage 32 so that the carriage is moved along, step by step, relatively to the table 34. At the conclusion of the operation of the machine, the main drive shaft is disconnected from the pulley 52 and brought to a stop automatically.

Figure 12:
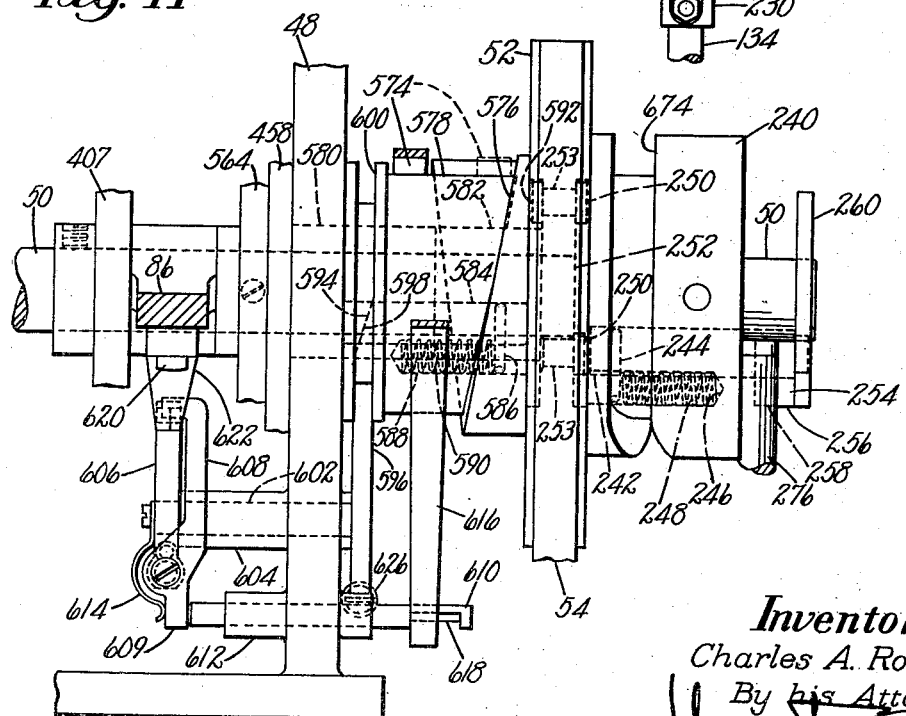
Fig. 12 is a view in front elevation, and at an enlarged scale, of a portion of the machine as viewed in Fig. 3 and showing certain clutch and control mechanisms.

Referring to Fig. 12, there is pinned to the drive shaft 50, adjacent to the pulley 52, a cam 240, see also Fig. 3. Slidable within this cam is a plunger 242 which carries a pin 244. Interposed between this pin and the bottom of a hole 246, in the cam, is a compression spring 248 which tends to urge the plunger to the left and into alinement with one or the other of three heads 250, located 120° apart within a circular recess 252 in the side of the pulley, and carried by three rivets 253. Mounted on the right-hand end of the plunger 242 is a cam block 254 having an inclined cam surface 256 and a stop surface 258 and secured to this end of the plunger is a disk 260 which is slidable on the end of the drive shaft 50. Journaled in the frame construction 48 is a shaft 262 which extends beyond the right-hand side of the frame, Figs. 1 and 3, and clamped to this shaft are a pair of arms 264, 266, the former of which is locked on the right-hand end of the shaft, Fig. 3, while the latter is positioned adjacent to, but spaced from, the side of the frame. Also connected to this shaft, within the frame construction, is a third arm 268 which carries a pin 270, Fig. 2. Rotatably mounted on this shaft, between the arm 264 and a fixed collar 272, is a fourth arm 274, Fig. 3, the end of which rests on the periphery of the cam 240, Fig. 1. The arm 264 carries at its outer end a cylindrically shaped finger 276 which is adapted to cooperate with the cam block 254 as shown in Fig. 12. A grasshopper spring 278, which surrounds the shaft 262 and engages the arms 264 and 274, urges the arm 264 upwardly to the position shown in Fig. 1. The arm 266 has a notch 280 in its outer end in which there is located a pin 282, carried by the frame 48, Figs. 13 and 19, and connected to this arm and the frame is a coil spring 284 which tends to rotate the shaft 262 in a counterclockwise direction as viewed in Figs. 1 and 13, and to the extent permitted by the engagement of the pin 282 with the lower side of the notch 280.

Journaled in the frame construction and projecting beyond the opposite sides thereof is a shaft 286, Fig. 19, and secured to this shaft, within the frame construction, is an upstanding arm 288, Fig. 2. This arm is formed with a hook portion 290 and a cam surface 300. Secured to the upper end of a second treadle rod 302 is a head 304 that is provided with a vertically disposed slot 306 having a laterally extending portion 308, Fig. 13. Threading into the arm 266 and passing through the slot 306 is a screw 310. The treadle rod 302 is connected to a starting treadle, not shown, by an extension 312 which is adjustably secured to the treadle rod by means of a block 314 and clamp screw 316. A coil spring 318, stretched between the screw 316 and a pin 320, mounted in the frame 48, tends to elevate the treadle rod. The head 304 is connected, by means of a link 322, to an arm 324 which is secured to the shaft 286, on one side of the frame 48, by means of a clamping screw 326. Also clamped to the shaft 286, on the opposite side of the frame is a third arm 328 to which there is connected a rod 330, Fig. 2. This rod extends forwardly to the front of the frame 48, through a guide plate 332, Fig. 3, and is provided with a hand knob 334, Fig. 2. A coil spring 336, Fig. 13, tends to rotate the shaft 286 and the arms 324 and 288, carried thereby in a counterclockwise direction.

The main drive shaft 50 is connected to the pulley 52; to start the machine, as a result of the downward movement of the treadle rod 302 by the starting treadle, not shown. Such downward movement of the treadle rod, when the screw 310 is located within the offset portion 308 of the slot 306, will effect rotation of the shaft 262 in a clockwise direction to the extent permitted by the engagement of the upper side of the notch 280 in the end of the arm 266 with the pin 282, as shown in Fig. 13. This angular movement of the shaft 262 is sufficient to withdraw the finger 276, on the end of the arm 264 from engagement with the cam block 254, thereby allowing the plunger 242 to be moved into alinement with one of the rivet heads 250 to connect the main drive shaft 50 to the pulley 52, and also to cause the hook portion 290 on the arm 288 to latch over the pin 270 on the arm 268 and hold the shaft 262 in the position to which it was moved by the starting treadle. The main drive shaft will now be rotated from the pulley 52 and, as this shaft rotates, the carriage 32 and cradle 30 will be fed along, step by step, by the action of the eccentric 212, pawls 200, 206, ratchet wheel 194, gear 190 and the rack bar 106 which, as explained above, is connected to the slide by the serrations 170, 180, Fig. 18.

At its right-hand end, this rack bar is provided with a cylindrical extension 340, Fig. 2, which, as the slide is moved to the right, eventually engages the arm 288 and swings it in a clockwise direction. As a result of this angular movement of the arm 288, the hook portion 290 thereof is disengaged from the pin 270 on the arm 268. If the starting treadle, associated with the rod 302, had been released immediately after the machine was started, the spring 284 will now rotate the shaft 262 in a counterclockwise direction and to the extent permitted by the engagement of pin 282 with the lower side of the notch 280, Fig. 13, and swing the arm 264 upwardly, Fig. 1, thereby reinserting the finger 276 between the side of the cam 240 and the disk 260. This finger will now engage the cam block 254 and, through the action of the cam surface 256 thereon, withdraw the plunger 242 from engagement with the head 250, finally bringing the main drive shaft to a stop by engagement with the stop surface 258. Just as this occurs, the end of the arm 274 drops behind a pin 342, carried by the cam 240, so that the main drive shaft is brought to rest in a predetermined angular position, Fig. 1. Before the main drive shaft is thus brought to a stop, however, the continued movement of the arm 288 by the extension 340 on the rack bar 106 will have rotated the shaft 286 far enough, in a clockwise direction, Fig. 13, to cause the arm 324 and link 322 to shift the head 304 of the treadle rod 302 to the right and to a position where the screw 310 on the arm 266 is in alinement with the vertical slot 306, thereby rendering the treadle rod 302 ineffective to trip the clutch. Hence, even though the starting treadle is inadvertently held down, after the machine is started, the main drive shaft 50 will be disconnected from the pulley 52 and brought to rest, in the manner explained above, as a result of the engagement of the extension 340 on the rack bar with the arm 288.

After the lasting operation has been concluded and the main drive shaft brought to a stop, the table 34 is depressed by the treadle rod 134 and the carriage 32 is returned to the position shown in Figs. 1 and 2 by means of the handle 112 so that the hook 126 is engaged with the pin 130. As the carriage is thus moved to the left, thereby withdrawing the extension 340 on the rack bar 106 from engagement with the arm 288, the spring 336 rotates the shaft 286 in a counterclockwise direction, Fig. 13, until the cam surface 300 on this arm comes into contact with the pin 270 on the arm 268, Fig. 2. Such angular movement of the shaft shifts the head 304 on the treadle rod 302 to the left, through the action of arm 324 and link 322, so that the screw 310 on the arm 266 is located within the offset portion 308 of the slot 306 in the head 304, thereby rendering the treadle rod again effective to trip the clutch. The arm 268 is provided with an ear 344 which extends toward the front of the machine and beneath a pin 346, carried by a boss 347 formed on the rearwardly extending portion 86 of the table 34. Although there is a slight clearance between this ear and the pin, when the table 34 is in the positions shown in Figs. 1 and 2, sufficient to permit depression of the table to release the hook 126 from the pin 130, the shaft 262 cannot be rotated far enough, in a clockwise direction, to permit the clutch to be tripped. This arrangement prevents damage to the parts which might occur if the machine was inadvertently started while the carriage 32 is held against movement, relatively to the table 34, by the engagement of the hook 126 with the pin 130. However, when the table 34 is elevated to present a shoe on the cradle in operative position with respect to the operating elements of the machine, the pin 346 is held well above the ear 344 so that the arm 268 may be moved to the position shown in Fig. 13 to effect the tripping of the clutch.

At certain times it may be desirable to operate the machine intermittently with the main drive shaft rotated through a single revolution, or several revolutions, and then brought to a stop each time the starting treadle, associated with the treadle rod 302, is depressed and released and it is for this purpose that the arm 328 and rod 330, Figs. 2 and 13, are provided. The rod 330 slides freely through a hole 348 in the guide plate 332 and, adjacent to where it passes through this plate, the rod is formed with a notch 350 having a vertical end 352 and an inclined portion 354, Fig. 20. When the machine is operating normally, this rod rests on the lower side of the hole 348 and slides freely in this hole, thereby permitting the hook portion 290 of the arm 288 to latch over the pin 270 on the arm 268 when the clutch is tripped, by the depression of the starting treadle, so that the main drive shaft continues to rotate until the extension 340 moves the arm 288 rearwardly, to the right in Fig. 13, and disengages the hook portion from the pin. However, if the rod 330 is shifted in a lengthwise direction and lifted up, by means of the hand knob 334, until the vertical end 352 of the notch 350 is in engagement with the side of the plate 332, the arm 288 will be moved to a position where the hook portion 290 thereof is beyond the path of movement of the pin 270 on the arm 268. Such movement of this arm is not, however, enough to shift the head 304 of the treadle rod 302 to a position where the screw 310 is in the vertical slot 306. Therefore, while the rod 330 is held in this position, if the starting treadle is depressed the main drive shaft will be connected to the pulley 52 during one or more revolutions thereof and then brought to a stop when the treadle is released. Should the treadle be held down long enough for the extension 340 to be brought into engagement with the arm 288, rearward movement of this arm, to disengage the clutch, will be permitted as the rod 330 is moved downwardly, to a position where it slides freely to the plate 332, by the camming action of the inclined surface 354. Accordingly, when the rod 330 is positioned in the location mentioned above, the starting treadle may be operated to cause the main drive shaft to rotate through any desired number of single revolutions.

The machine is adapted to operate, progressively, along the selected portions of the opposite sides of the bottom of a shoe as, for example, from the breastline to the ball line. It is also arranged to accommodate shoes of different sizes and styles. In order to adjust the machine for operating on a particular style of last, a shoe of any selected size on the particular style of last is placed on the cradle 30 with the heel pin 66 inserted in the last hole and the forepart of the shoe resting on the toe rest 60. The treadle rod 134 is now depressed, to lower the table 34, and the carriage 32 moved to the right far enough to disengage the latch 126 from the pin 130. Next, the treadle rod 134 is permitted to rise, as the table 34 is moved upwardly by the spring 124 and lever 122, while the upper end of the slot 138 is held against the cross shaft 118 so that the pawls 200, 206 are shifted out of engagement with the ratchet wheel 194. Restraining the upward movement of the table in such a way that the bottom of the shoe is maintained some distance below the rollers 44, 46, the operator moves the carriage 32 to the right until a stop abutment 360, secured to the rack bar 106, Fig. 1, comes into engagement with the cross web 84 which extends between the side portions 80, 82 of the table. Now, while holding this abutment firmly against the cross web, by means of the handle 112, thereby restraining movement of the rack bar, the operator shifts the hand knob 160, Fig. 18, to the left to disengage the serrations 170, 180 and, by rotating this hand knob he moves the carriage, relatively to the rack bar, until the ball portion of the shoe is in alinement with the operating elements of the machine. The hand knob is now released, allowing the spring 182 to reengage the serrations 170, 180, thereby locking the rack bar to the carriage.

The stop abutment 360 is so positioned on the rack bar that, when it is in engagement with the cross web 84, the extension 340 on the rack bar moves the arm 288 in a clockwise direction, Fig. 13, to a position where the hook portion 290 is disengaged from the pin 270 on the arm 268 and the head 304 on the treadle rod 302 is shifted to the right so as to bring the screw 310 on the arm 266 in alinement with the vertical slot 306 in the head 304 of the treadle rod 302. As has already been explained, when the arm 288 is in this position, the main drive shaft 50 is disconnected from the pulley 52 and brought to rest and the clutch plunger 242 cannot be released by depressing the treadle rod 302. Next, the operator moves the carriage 32 to the left, Figs. 1 and 2, until the breast line of the bottom of the shoe is in alinement with the operating elements of the machine and fully releases the treadle rod 144, thus allowing the table 34 to be elevated, by the spring 124, until the bottom of the shoe is held yieldingly against the rollers 44, 46.

Now, when the treadle rod 302 is depressed and the machine started, the carriage 32 will be moved along, step by step, until the ball portion of the shoe is reached whereupon the extension 340 will again move the arm 288 in a clockwise direction and bring the machine to a stop. The table 34, carriage 32 and cradle 30 are now returned to the positions shown in Figs. 1 and 2 before the shoe which has just been operated on is removed and another shoe loaded onto the cradle.

Figure 18:
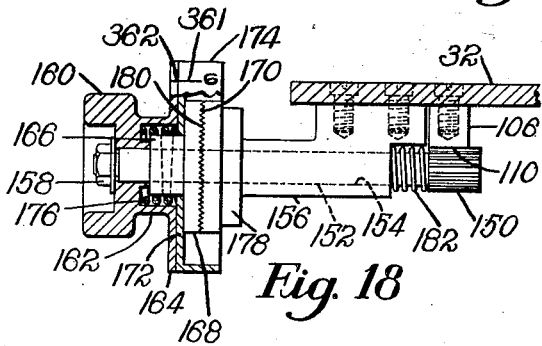
Fig. 18 is a view in front elevation of a portion of the shoe-feeding mechanism, with certain parts in section.

The drum 174 is provided with a circumferential series of indicia lines 361, corresponding to a range of sizes, for example three to nine, one of which, for size six, appears in Fig. 18. Assuming that the shoe selected was size six, the drum 174 is now rotated until the size six indicia line is brought into register with an index mark 362 on the periphery of the flange 164 of the hand knob 160. These indicia lines and rack teeth 110 are so spaced and the pinion 150 is of such a size that, when the hand knob is moved to the left, to disengage the serrations 170, 180, and rotated to bring another selected size indicia on the drum 174 in register with the index mark 362 on the flange 164 of this hub, the rack bar 106 will be shifted, relatively to the carriage 32, to a position where the machine will be brought to a stop when the ball line of that particular size shoe is reached. Accordingly, when a shoe of a different size, but on the same style of last, is placed on the cradle 30 the operator merely has to notice its size and appropriately reposition the rack bar 106, relatively to the carriage 32, by means of the hand knob 160 and the indicia marks on the drum 174, before starting the machine. It will be understood, when changing over from one style of last to another, that the rack bar 106 must be readjusted, with the ball line of a shoe of a selected size on that particular last in alinement with the operating elements of the machine, and drum 174 repositioned to bring the indicia line 361, of the selected size, into register with the index mark 362, in the manner described above.

After a shoe has been placed on the cradle 30, it is shifted laterally, while the table 34 is allowed to rise under the control of the treadle rod 134, by sliding its forepart over the toe rest 60 and moving the heel pin 66 relatively to the block 30, as permitted by the sliding of the shaft 70 in the ears 72, 72, Fig. 3, until the heel end of the shoe is approximately centered with respect to the roller 46 and the longitudinal median line of the shoe bottom, from heel-breast line to ball line substantially parallel with the direction of movement of the carriage 32. Referring to Figs. 1, 2 and 3, a pair of upstanding arms 370, 370 are secured to a shaft 372, Fig. 2, which is journaled on the inner end of the slide 32. At their upper ends, these two arms are joined by a cross member 374 on which there is mounted a V-shaped abutment 376, adapted to embrace the heel end of a shoe, Fig. 3. Secured to this shaft 372 is a forwardly extending arm 378, Fig. 1, and a rearwardly extending arm 380, Fig. 2. Stretched between the arm 380 and the upper part of the bracket 78 on the carriage 32 is a tension spring 382 which tends to rotate the arms 370, 370 and abutment 376 in a counterclockwise direction, Figs. 1 and 2. Such movement of these arms, however, is prevented and the abutment 376 held away from the heel end of a shoe on the cradle, when the parts are in the position shown in Figs. 1 and 2, by the engagement of the end of the arm 378 with a plate 384 which is secured to the table 34, Fig. 1. As the carriage 32 is moved rearwardly to bring the breastline of the shoe into alinement with the operating elements, before the machine has been started, the arm 378 rides down an inclined surface 386 on the plate 384, Fig. 1, thus allowing the spring 382 to move the V-shaped abutment 376 yieldingly into engagement with the heel end of the shoe. As the V-shaped abutment engages the shoe, it will accurately center the heel end of the shoe and will hold it in this position, during the operation of the machine. The pressure of this abutment against the heel end of the shoe also rocks the shoe in a counterclockwise direction, Fig. 1, in such a way as to urge the forepart of the shoe firmly against the toe rest 60. With the heel end of the shoe thus located, the operator may, if necessary, re-aline the longitudinal median line of the bottom of the shoe into parallelism with the direction of movement of the slide by shifting the toe end of the shoe relatively to the toe rest, before starting the machine. Now, while the shoe is held in this position, the treadle rod 134 is fully released to permit the table 34 to rise and bring the bottom of the shoe against the rollers 44, 46 and the machine is started, by means of the starting treadle. At the conclusion of the operation of the machine, when the carriage 32 and table 34 are returned to the positions shown in Figs. 1 and 2, the abutment 376 is withdrawn from the heel end of the shoe, as the end of the arm 378 rides up the inclined surface 386 on the plate 384, thereby releasing the shoe for removal from the cradle.

As the shoe is fed along, step by step, during the operation of the machine, the table 34 will be moved up and down as the spring 124 holds the bottom of the shoe yieldingly against the rollers 44, 46. However, during the operation of the wipers 38 and tacking devices 40, the table 34 is locked against downward movement so that the shoe is held firmly in operating position. For thus locking the table, the square upper portion 144 of the treadle rod 134, Fig. 3, passes through a square-sided slot 388 formed in a block 390 which is secured to the frame construction 48, Figs. 1, 3 and 11. Pivotally mounted in this slot, by means of a pin 392 which passes through holes in the block 390, is a locking lever 394 having a friction surface 396. A coil spring 398 tends to swing this lever in a counterclockwise direction, Fig. 3, so as to bring the friction surface thereon into gripping engagement with the square portion 144 of the treadle rod. Mounted on a stud 400, supported by the frame construction 48, Fig. 2, is a bell-crank lever 402 one arm of which carries a cam roll 404. In the other end of this bell-crank lever there is a screw 406 which bears against the end of the lever 394, Figs. 2 and 3. The cam roll 404 is in contact with the periphery of a cam 407 which is secured on the main drive shaft 50, Fig. 19. This cam is so shaped, Fig. 21, that the treadle rod 134 is locked, by the lever 394, thereby preventing downward movement of the table 34, while the wipers and tacking devices are being operated and unlocked during the remainder of each revolution of the main drive shaft, or operating cycle of the machine. The main drive shaft is brought to rest with the cam 407 in a position to unlock the treadle rod, thus releasing the table for upward movement by the spring 124 when the latch 126 is disengaged from the hook 130. In order to prevent the inadvertent withdrawal of the carriage 32 from the table 34, when the latch 126 is disengaged and as the carriage is being moved, relatively to the table, a stop pin 408, fitted in the carriage, Fig. 1, is arranged to engage an abutment plate 410 which is secured to the table, Fig. 3.

*The operating elements*

As pointed out above, the operating elements of the machine, i. e., edge gages 36, 36, wipers 38, 38 and tacking devices 40, 40, are supported on a head member 42. Referring to Figs. 3, 4 and 5, this head member comprises a vertically extending plate 418 which is secured at its lower ends, by means of screws 421, Fig. 2, to a pair of bushings 420, 420 that are journaled in bearing bores 422, formed in the upper part of the frame construction 48, Figs. 2, 3, 4 and 5. This plate is cut away, as indicated by the reference character 424 in Fig. 6 to provide a clearance space and the roller 44 extends across and in front of the upper portion of this clearance space, this roller being journaled at its opposite ends in brackets 426, 426 which are secured to the plate. The roller 44 is reduced in diameter at its mid-portion and is provided with oppositely inclined conical portions 428, 428 adjacent thereto. Fastened to the front of the plate 418, by means of screws 430, 430 is a bracket 432 which has a bifurcated lower end which extends downwardly, and at an angle away from the plate, Fig. 10. The roller 46 is carried by a shaft 434 which is received in slots 436 formed in the lower bifurcated end of the bracket. Secured to the bushing 420, which appears on the left-hand side of Fig. 3, is a plate 438 and stretched between this plate and a pin 440 in the lower part of the frame 48 is a tension spring 442. This spring is of sufficient strength to counterbalance a substantial part of the weight of the head 42, and other elements carried thereby, when this head is inclined, in either direction, from a vertical position.

Referring to Figs. 3 and 4, the bushing 420 which appears on the right-hand side of Fig. 3 has a portion of enlarged diameter on which there are ratchet teeth 450, see also Fig. 2. Pivotally mounted on the frame construction 48 is a lever 452 on one end of which there is a cam roll 454 and a coil spring 456 is arranged to rotate this lever in a clockwise direction, Fig. 2, and thereby urge the cam roll toward engagement with the peripheral surface of a cam 458, carried by the main drive shaft 50, see Fig. 19. On the opposite end of this lever there is pivotally mounted a pawl 460 in which there is a pin 462 and, stretched between this pin and another pin on the lever 452, is a tension spring 465 which tends to swing the pawl 460, in a clockwise direction and toward engagement with the ratchet teeth 450 on the bushing 420. When the lever 452 is moved to the position shown in Fig. 2, by the action of the cam 458, the pawl 460 is held away from these ratchet teeth by the engagement of the pin 462 with the inclined end 464 of a plate 466 which is secured to the frame construction 48. The cam 458 is so shaped that the lever 452 is first swung in a clockwise direction by the spring 456, and then returned to the position shown in Fig. 2 by this cam, each time the main drive shaft rotates through a single revolution. As the lever 452 swings in a clockwise direction, the pin 462 passes beyond the inclined end 464 of the plate 466 so that the pawl is moved into engagement with the ratchet teeth. When the lever is returned to the position shown in Fig. 2, the pin rides up over the inclined end of the plate thereby withdrawing the pawl from engagement with the ratchet teeth.

During the operation of the machine, the head 42 on which the operating elements are mounted is swung, about the axis of rotation of the bushings 420, see line x—x, Fig. 6, for the purpose of bringing the operating surfaces of the wipers 38, 38 into substantial parallelism with those portions of the shoe bottom engaged by these wipers. Referring to Fig. 10, the axis of rotation of the bushings 420, indicated by the cross x, extends across the bottom surface of the insole I of the shoe S substantially in the location where the roller 46 makes contact with the insole. When the conical portions 428 of the roller 44 engage the overlaid lasting margin M of the upper of the shoe, as illustrated in Figs. 6 and 10, and the roller 46, elevated until the shaft 434 is against the upper end of the slot 436, see broken line position in Fig. 10, contacts the insole between the inner edges of the margin of the upper, see Fig. 4, the operating surfaces of the wipers 38, 38, which contact the upper at the opposite sides of the shoe in centered relation to the axis x—x, see Fig. 10, will be in the desired parallelism with the bottom of the shoe. As will be seen in Fig. 1, the bottom of the shoe has a lengthwise contour which is generally in the shape of a concave curve, which, viewed with the shoe upside down, slopes upwardly from the breastline to the ball portion, the steepness of this slope being proportional to the height of the heel. The heel pin 66 is so adjusted, relatively to the block 62, by threading it in or out of the block, that with the shoe supported on the cradle, by means of the heel pin 66 and the toe rest 60, a line between the breastline and ball portion of the shoe will be substantially parallel to the direction of movement of the carriage 32, relatively to the table 34.

Referring to Fig. 1, there is secured to the head 42 a forwardly extending arm 470 to which there is connected a link 472. This link is provided with an elongated slot 474 which receives a headed pin 476, mounted on the table 34, Fig. 3. The length of this link and the slot therein are such that with the table held down by the latch 126, the head 42 is swung forwardly to the position shown in Fig. 1. Thus, when the table is released and permitted to rise, under the action of the spring 124, so that the roller 46 is brought into contact with the insole, adjacent to the breastline of the shoe, due to the forward inclination of the head 42, the roller 44 will be elevated somewhat above the overlaid lasting margin M of the upper. However, immediately upon the starting of the machine, the rise of the cam 458 will pass beyond the roll 454 and the head 42 will be rocked, in a counterclockwise direction, see arcuate arrow Fig. 10, by the action of the lever 452, pawl 460 and spring 456, Fig. 2, until the roller 44 is brought into engagement with the overlasted margin of the upper, thereby leveling the operating surfaces of the wipers with respect to the shoe bottom. The spring 456 is relatively light and is not strong enough to cause the shoe to be displaced downwardly, against the resistance of spring 124, Fig. 2, by the pressure exerted on the shoe by the roller 44. As the main drive shaft completes a revolution, the cam 458 again engages the cam roll 454 and returns the lever 452 and pawl 460 to the position shown in Fig. 2. Referring to Fig. 21, a feeding increment of the carriage 32 is effected during the first 180° of each revolution of the main drive shaft 50 and the cam 458 is so arranged on this shaft that the leveling action, just described, occurs before, or at least when, the feeding movement of the carriage is completed and the lever 452 and pawl 460 are returned to the positions shown in Fig. 2 while the slide is stationary and during the next 180° rotation of the drive shaft.

As will be explained below, means are provided for locking the head 42 against rotation about the axis x—x during the second half of each revolution of the drive shaft and while the wipers or tacking devices are being operated. Because of the manner in which the shoe is supported on the toe rest 60 and heel pin 66, the bottom of the shoe will slope downwardly and then upwardly, with respect to the direction of feed of the shoe. Thus, during the first several feeding increments of the shoe, which occur in the direction of the straight arrow in Fig. 10, the insole I may slope downwardly, away from the roller 46, in such a way that this roller will tend to drop down from the position in which it is shown in Fig. 10. If this occurs, the upward pressure exerted by the bottom of the shoe on the roller 44, through the action of the spring 124, will first swing the head about axis x—x in a clockwise direction, oppositely to the arcuate arrow in Fig. 10, until the roller 46 is elevated to the position shown in Fig. 10, after which the pawl 460 will become effective, through the action of spring 456 to swing the head reversely, in the direction of the arcuate arrow, Fig. 10, to level the wipers. Accordingly, each time the shoe is fed along, the head 42 will be automatically swung to a position where the wipers are leveled with respect to the bottom of the shoe, as a result of the action of the spring 456 and pawl 460.

The plate 438 extends rearwardly beyond the bushing 420, to which it is secured, and over a friction block 480, that is secured to the side of the frame construction 48, Fig. 9. Pivotally mounted on a bracket 482, which is attached to the frame by screws 484, is a bell-crank lever 486 one of the arms of which is rounded off, adjacent to the plate 438. A rod 488 is connected to the other arm of this bell-crank lever and mounted on this rod is a pin 490. Stretched between this pin and another pin in the frame 48 is a coil spring 492 which tends to move the rod to the right, Fig. 9, and thus cause the rounded arm of the bell-crank lever to pinch the plate 438 against the friction block 480, thereby locking the head 42 against rotation. The rod 488 passes through a bore 492, formed in a block 494 which is secured to a lever 496 and, beyond this block, a collar 498 is fastened to the rod. As will appear below, the lever 496 is associated with the wiper-operating mechanism and is moved to the position shown in Fig. 9 during that part of each operating cycle when the shoe is being fed along. When this arm is in this position, the block 494 engages the collar 498 and withdraws the rounded arm of the bell-crank lever 486 from engagement with the plate 438. However, after the completion of a feeding increment of the shoe, and during the last half of the operating cycle, the lever 496 is swung inwardly toward the side of the frame 48, thereby releasing the rod 488 and permitting the spring 492 to swing the bell-crank lever 486 into locking engagement with the plate 438.

The edge gages 36, 36 each comprise a lip portion 500 formed on the end of a cylindrical member 502, Fig. 7. These cylindrical members are slidably received in bores 504, formed in each of the bushings 420, see Fig. 2, and clamped to a portion of reduced diameter 506, on the outer end of each of the cylindrical members 502 is a collar 508. An L.-shaped arm 510 is connected to each of these collars by means of a screw 512 which passes through a slot 514 in the arm and is threaded into the collar. These arms are each connected to one of a pair of intermeshing gears 516 which are journaled on the rear side of the plate 418 by means of studs 518, Fig. 5. Stretched between these arms is a tension spring 520 which exerts a force tending to pull these arms toward each other and thereby move the edge gages inwardly into engagement with the opposite sides of a shoe, supported on the cradle 30. Before the machine is started, such movement of the arms 510 and edge gages 36 is prevented by the engagement of notches 521, formed in the opposite ends of a latch bar 522 with pins 524, 526 carried by the gears 516, Figs. 5 and 10. This locking bar is guided for vertical movement on the rear side of the plate 418, by means including a guide pin 528 and slot 530, Fig. 10, and has a rearwardly extending portion 532 to which there is adjustably connected by means of a screw 534, a link 536. This link is joined, by a pin-and-slot connection, to one end of a lever 538 which extends through, and is pivotally mounted between, the bifurcated lower ends of the bracket 432, by means of a pin 540. The other end of this lever extends over the roller 46 and is urged in a clockwise direction, to hold the latch bar 522 in the elevated position in which it is shown in Fig. 5, and in engagement with the pins 524, 526 by means of a spring 542, the opposite ends of which rest on screws 544 threaded into the plate 418.

When a shoe is loaded onto the cradle 30 and moved upwardly into engagement with the roller 46, this roller will be elevated to the broken-line position shown in Fig. 10, as already explained. As a result of the elevation of this roller, the lever 538 will be swung in a counter-clockwise direction thereby pulling the latch bar 522 downwardly and disengaging its notched ends from the pins 524, 526. The edge gages will now be moved inwardly, by the arms 510 and spring 520 and, since the gears 516 are intermeshed, the extent of inward movement of these edge gages will be equalized. As explained above, the heel end of the shoe, adjacent to the breastline, will have been accurately centered, by the operator and also by the action of the V-shaped abutment 376, when the shoe was presented to the machine. Hence, the edge gages will be moved into engagement with, and will bear with substantially equal pressure against, the opposite sides of the shoe adjacent to the breastline, see Figs. 4 and 6. The spring 520 is relatively light and not strong enough to displace the shoe laterally while it is held in place on the cradle 30, as a result of the downward force exerted on the bottom of the shoe by the rollers 44, 46 and by the cramping action of the V-shaped abutment 376, or to cause the edge gages to mark the upper. During each of the feeding movements of the slide 32, the edge gages will be held yieldingly against the opposite sides of the shoe by the spring 520 and if the ball portion of the shoe had been properly centered, so that the longitudinal median line of its bottom, between breastline and ball portion, is parallel to the direction of feed, such yielding contact between the edge gages and the opposite sides of the shoe will be maintained as the lasting operation proceeds from breastline to ball portion. Otherwise, the screw-and-slot connection between the arms 510 and the collars 508 will permit a repositioning of one or the other of the edge gages, in a manner that will presently appear.

The edge gages are locked against movement after each feeding movement of the slide is completed, to serve as abutment means for limiting the inward movement of the wipers and tacking devices. Referring to Fig. 3, the frame construction 48, adjacent to the inner portions of each bushing 420, is slotted at 550. Slidable in each one of these slots, on guide pins 552, is a locking plate 554 which is provided with teeth 556, adapted to engage similar teeth 557 cut on the cylindrical portion 502 of the edge gages, Fig. 7, one of these locking plates appearing in Fig. 2. Each of these plates has an arcuate lower edge 558 which rides on a correspondingly shaped surface 559 formed on one end of a lever 560. These two levers are pivotally supported on the frame and carry cam rolls 562. Coil springs 563, one of which appears in Fig. 2, are arranged to swing these levers in a direction to hold the cam rolls 562 in contact with a pair of similarly shaped cams 564, secured to the main drive shaft 50, Fig. 19. Each of these cams has a drop portion 566, Fig. 2, which allows the springs 563 to swing the levers in a direction to engage the locking plates 554 with the teeth 557 on the edge gages. Referring to Fig. 21, it will be seen that the drop portions of these cams are so arranged that the edge gages are locked during a portion of the second half of each revolution of the main drive shaft 50.

After the machine has come to a stop and when the table 34 is returned to the position shown in Figs. 1 and 2, the edge gages are automatically withdrawn and latched in open position by the latch bar 522. Referring to Fig. 3, one end of a lever 570, which is pivotally mounted on the lower side of a stud 572, carried by the frame 48, is connected to the collar 508, at the right-hand side of the machine, Figs. 3 and 4. On its other end, this lever carries a cam roll 574 which, as shown in Fig. 12, is adapted to be engaged by a cam track 576, formed on a cam 578. This cam is rotatably mounted on a bearing bushing 580, pressed into the side of the frame 48, and on a hub portion 582, formed on the pulley 52, through which the main drive shaft 50 extends. Slidable in this cam is a plunger 584 in which there is a pin 586. Interposed between this pin and the bottom of a hole 588 is a compression spring 590 which tends to urge the plunger 584, to the right in Fig. 12 and into the path of travel of a head 592, formed on one of the rivets 254. Movement of the plunger in this direction, however, is at times prevented by the engagement of the inclined end 594 of a lever 596 with an oppositely inclined surface 598 formed in that side of the plunger 584 that extends across an annular groove 600 in the cam 578, Figs. 12 and 13. The lever 596 is fast on the outer end of a shaft 602 which is journaled in a boss 604, on the frame construction 48, and clamped to the inner end of this shaft is an upwardly extending L-shaped arm 606. Pivoted on the lower end of this arm is a finger 608 having a downwardly extending end 609 which is in line with a rod 610 that is slidable in a boss 612 on the frame. A leaf spring 614, secured to the end of the shaft 602, bears against the end 609 on the finger 608. Secured to the lever 570 is a downwardly extending arm 616, Fig. 13, the lower end of which rests in a notch 618 cut in the right-hand end of the rod 610. Fastened to the rearwardly extending arm 86 of the table 34, by means of a screw 620, is an L-shaped bracket 622 which is in alinement with the L-shaped arm 606 and provided with a notch 624.

When the edge gages are released, as a result of the engagement of the bottom of the shoe with the roller 46, and moved inwardly by the spring 520, the lever 570 will be rocked in such a way that the roll 574 thereon is shifted to the right, Fig. 12, from the solid line to the dotted line position. Because of this movement of the lever 570, the rod 610 will be moved to the right by the engagement of the arm 616 with the right-hand end of the notch 618. The leaf spring 614 can now swing the finger 608 in a counterclockwise direction and far enough to insert its end between the end of the L-shaped arm 606 and the end of the L-shaped bracket 622, see Fig. 13. After the completion of the operation of the machine and upon the return of the table 34 to the position shown in Figs. 1 and 2, the arm 606 will be rotated in a clockwise direction, against the resistance of a coil spring 626, by the action of the bracket 622, finger 608 and arm 606, thereby withdrawing its inclined end 594 from engagement with the plunger 584 and permitting this plunger to be moved into line with the head 592 by spring 590. The cam 578 accordingly will be rotated by the pulley 52 and the edge gages withdrawn sufficiently to let the latch bar 522 again engage the pins 524, 526, Fig. 5, by the action of the cam track 576 on the roller 574. As the edge gages are thus returned to latched position, the arm 616 will shift the rod 610 to the left, Fig. 12, thereby rotating the finger 608 in a clockwise direction, against the resistance of leaf spring 614, until its end is in register with the notch 624 on the bracket 622. The spring 626 will now return the lever 596 to the position shown in Fig. 13 and the plunger 584 will be withdrawn from the head 592, by the action of the inclined end 594 of this lever on the inclined surface 598 of the plunger, thereby bringing the cam 578 to rest after it has made a single revolution.

The wipers 38, 38 are each pivotally mounted, by means of a pin 630, on a slide 632, Figs. 4 and 7. These slides are T-shaped in cross section and are slidable in correspondingly shaped passages in the bushing 420, one of the slides appearing in Fig. 2. Secured to each of these slides is a collar 634 and a spring-pressed plunger 636, mounted in an edge gage 36, bears against each of these collars. Each of the slides 632 has a shoulder 638 and the spring-pressed plunger holds this shoulder in contact with the collar 508 on one of the edge gages, Figs. 5 and 7, so that the operating surface of the wiper 38 is urged into contact with the ledge 500 of the edge gage by a compression spring 640, Fig. 7. The slides 632 extend outwardly, from the opposite sides of the frame construction 48, for some distance and beyond the collars 634 these slides are provided with oppositely facing ratchet teeth 642, 644, Fig. 8. Adjacent to these ratchet teeth, the slides are cut away to provide guide surfaces for blocks 646, 646 one of which appears in Fig. 1. In each of these blocks there are mounted pawls 648, 650 adapted to cooperate, respectively, with the ratchet teeth 642, 644, Fig. 8. These pawls carry pins 652, 654 and springs 656, 658 are arranged to swing these pawls toward engagement with the ratchet teeth 642, 644. The block 646 which is on the left-hand side of the machine as viewed in Fig. 3 is connected to one end of the lever 496, previously mentioned, see Fig. 9, while the other block 646 is connected to one end of a lever 670, Figs. 3 and 4. The lever 670 is pivotally mounted on the stud 572, Fig. 3, and carries a cam roll 672 which rides in a cam groove 674 on the cam 240 while the lever 496 is pivoted on another stud 676, mounted on the frame 48, and carries a cam roller 678 which rides in a cam groove 680, formed in a cam 682, Fig. 3. The cam 682 is pinned to the main drive shaft 50, similarly to the cam 240, and the cam grooves 674 and 680 are so shaped that, during each revolution of the main drive shaft 50, the blocks 646, 646 are moved toward the sides of the frame construction 48 and then returned to the positions shown in Fig. 3.

When these blocks are in the retracted positions in which they are shown in Fig. 3, the pawls 648, 650 are held away from the ratchet teeth 642, 644 by the engagement of the pins 652, 654 with surfaces 684, 686 formed on the outer end of arms 688, 688 which extend outwardly over the blocks from the frame construction 48, Fig. 3. At their inner ends, the surfaces 684, 686 are inclined toward each other to form camming surfaces 690, 692. As the blocks 646, 646 start to move toward the frame 48, the pins 652, 654 soon ride down the camming surfaces 690, 692 thereby permitting the pawls 648, 650 to be moved into engagement with the ratchet teeth 642, 644 and, as the blocks continue to move, the slides 632, 632 will be carried along with the blocks, the pawls 650, 650 slipping over the ratchet teeth 644. Now, when the blocks are moved in the opposite direction, the pawls 650 will engage the ratchet teeth 644 and the slides 632 will be withdrawn until the pins 654, in the pawls 650, ride up the camming surfaces 692, thereby withdrawing these pawls from engagement with the ratchet teeth 644. Thus, regardless of where the slides 632 are positioned, when picked up by the pawls 648, these slides will be moved inwardly a predetermined distance, as provided by the throw of the cam tracks 674, 680, and then returned to their starting positions, each time the main drive shaft 50 makes a single revolution.

When the edge gages 36, 36 are moved into engagement with the opposite sides of a shoe, by the arms 510 and spring 520, upon the tripping of the latch bar 522, the wipers 38, 38 and wiper slides 632, 632 will be carried inwardly with the edge gages as a result of the engagement of collars 508, 508 with the shoulders 638, 638 on the wiper slides. At this time, and also during each feeding movement of the carriage 32, the blocks 646, 646 will be withdrawn to positions in which the pawls 648, 650 are held away from the ratchet teeth 642, 644, see Fig. 8, so that the wipers and wiper slides are free to follow the inward and outward movements of the edge gages as these edge gages are urged inwardly into engagement with the marginal edges of the opposite sides of the shoe by the spring 520; the wiper slides each being held in a predetermined position, relatively to its associated edge gage, by the action of a spring-pressed plunger 636, Fig. 8, which holds the collar 508 on the edge gage in contact with the shoulder 638 on the wiper slide. During the second half of each revolution of the main drive shaft 50, the wipers are moved inwardly, relatively to the edge gages, see Fig. 4, thereby bringing the operating surfaces of the wipers into engagement with the margin of the upper, and then returned to their starting positions, such relative movement between the wipers and the edge gages being permitted by the spring-pressed plungers 636.

As suggested above, because of the equalizing action of the intermeshed gears 516, 516, as the lasting operation progresses toward the ball portion, one or the other of the edge gages may not be held in contact with the edge of the shoe, if the longitudinal median line of the shoe bottom, between breastline and ball portion, is not exactly in alinement with the direction of movement of the slide 32, or because of differences in the edge contour on the opposite side of the shoe bottom. When such condition exists, however, this edge gage will be brought into contact with the edge of the shoe, during the initial movement of its associated wiper slide. It will be recalled that the arms 510 are connected to the collars 508 by means of screws 512 and slots 514, Fig. 8. Hence, when the wiper slides start to move inwardly, either one of the edge gages which is not in contact with the shoe will be carried along, as permitted by the lost motion between the screw 512 and slot 514 in the arm 510, with the wiper slide, through the action of the spring-pressed plunger 636, until it is brought into engagement with the edge of the shoe and the pressure exerted by the edge gages on the shoe equalized. Also, the shoe may be displaced laterally by the pressure exerted on it by the other edge gage, through the action of its associated plunger 636, thereby facilitating this equalizing action of the edge gages, such lateral movement of the shoe being permitted by rotation of its heel end on the heel pin 66 and sliding of its forepart on the toe rest 60. Shortly after this equalizing action occurs, the edge gages are locked against movement by the action of cams 564 and locking plates 554, see Fig. 21. Thereafter, the wipers 38, 38 are each moved inwardly, relatively to the edge gages, by the continued movement of the wiper slides, to perform their wiping actions, see Fig. 4, such inward movement of the wipers being of the same extent, as determined by the throw of cams 240 and 682 except as such movements may be effected by the slight lost motion required to cause the edge gages to bear with equal pressure on the opposite sides of the shoe. When the wipers thus move inwardly over the bottom of the shoe, the lasting margin of the upper, at each side of the shoe, is wiped in over, and pressed firmly against, the shoe bottom, as the wipers yield upwardly against the resistance of springs 640, Fig. 8.

Figure 17:
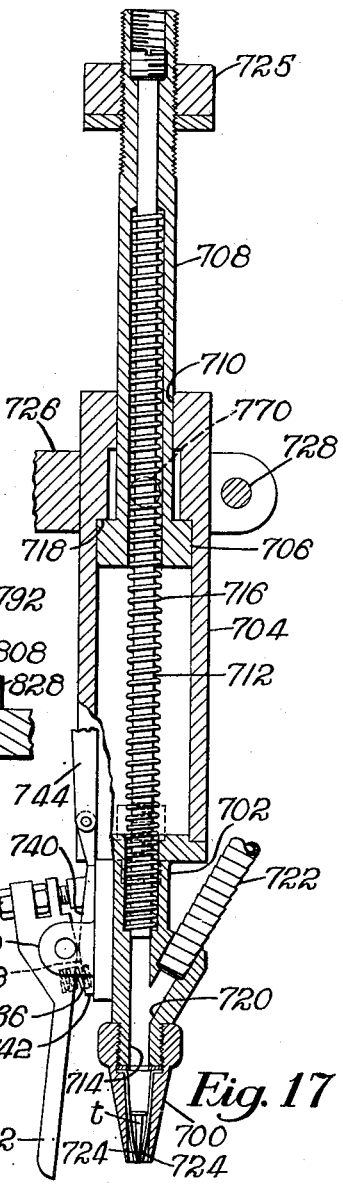
Fig. 17 is a view in vertical section of one of the tack driving devices.

Each of the tacking devices 40 comprises a tack nozzle 700 secured to a head 702 which extends downwardly from a cylinder 704, Fig. 17. Mounted in this cylinder is a piston 706 having a piston rod 708 which passes up through a bore 710 in the upper end of the cylinder. Secured to this piston rod is a driver 712 which extends downwardly through the piston rod, piston in cylinder and into a driver passage 714 formed in the head 702. A coil spring 716, surrounding this driver and seated at its opposite ends in the piston rod and head, tends to hold the piston and driver elevated, with the piston resting against a shoulder 718 formed in the cylinder. Intersecting the driver passage is a tack feeding passageway 720 to which there is connected a tack tube 722. Each tack nozzle is provided with a pair of tack retaining fingers 724 adapted to hold a tack t in the position shown in Fig. 17. Threaded on the upper end of the piston rod is a stop abutment 725 for limiting the downward movement of the piston and driver.

Each of the cylinders 704 is clamped to an arm 726 which is pivotally mounted on a stud 728, carried by an upwardly extending part of the plate 418, Fig. 4. Pivoted on a bracket 730, secured to the lower end of each cylinder, is a stop finger 732 which carries an abutment screw 734 and compression spring 736. The screw and spring are in engagement, respectively, with wedge surfaces 738, 740 formed on a wedge block 742, Fig. 17. The blocks 742 are each formed on the lower end of a rod 744 which in turn, is connected, by means of a link 745, to an arm 746, pivotally mounted on one of the arms 726, Figs. 3 and 4. The rods 744 extend up through holes in the arms 726 and carry stop pins 747. Connected to each of the arms 746 is a link 748 provided with a slot 750 through which there extends a pin 752, carried by the plate 418. A loop spring 754, connected to the arms 726, 726 tends to swing the cylinders about the studs 728 in directions to separate the tack nozzles to the extent permitted by the engagement of the stop fingers 732, 732 with the inner ends of the two bushings 420, 420, Fig. 3. With the tacking devices in these positions, coil springs 756, 756, Fig. 3, pull the rods 744, 744 downwardly to the extent permitted by the engagement of the stop pins 747 with the upper surfaces of the arms 726.

The tack nozzles 700 are directly in line with the wipers 38 and are adapted to be received within grooves 760 formed on the inner ends of these wipers, Figs. 4 and 7. Located in each of these grooves is a spring-pressed plunger 762, Fig. 7. During the inward movements of the wiper slides and wipers with the edge gages 36, the tack nozzles are picked up by these spring-pressed plungers and carried along by the wipers, thereby causing the cylinders 704 and arms 726 to pivot about the studs 728. As a result of such pivotal movement of these arms, the links 748 are first moved downwardly, until the upper ends of the slots 750 approach contact with the pins 752. During continued swinging movement of the arms 726, as a result of the further movement of the tack nozzles, by the wipers, the arms 746 will be rotated, relatively to the arms 726 in a direction to pull the rods 744 and wedge blocks 742 upwardly. As the wedge blocks are thus moved upwardly the stop fingers 732 will be rotated on their supporting brackets 730, 730. These fingers extend downwardly beyond shoulders 764, formed on the outer edges of the edge gage wipers 500, Fig. 7, and when the wipers are moved inwardly, relatively to the edge gages, these fingers come into engagement with these shoulders, thereby limiting the extent of inward movement of the tack nozzles by the spring-pressed plungers 762. The greater the amount of inward movement imparted to the edge gages, when they are brought in against the opposite sides of the shoe, the more closely will the upper end of the slots 750 approach the pins 752 and, accordingly, the greater will be the extent of upward movement of the wedge blocks 742, during the subsequent inward movement of the tack nozzles, by the wipers. Because of the manner in which the wedge surfaces 740 are inclined, as these wedge blocks are moved upwardly, the stop fingers 732 will be swung inwardly toward the tack nozzles. Now, the closer these fingers are moved toward the tack nozzles, the less will be the extent of inward movement which can be imparted to the tack nozzles before these fingers strike the shoulders 764 on the edge gage wipers 500. Accordingly, these stop fingers will be positioned in accordance with the locations of the edge gages, when in engagement with the shoe, and since the extent of inward movement of the edge gages is determined by the width of the bottom of the shoe, at the location where the edge gages make contact, the extent of inward movement of the tack nozzles by the wipers will vary in accordance with the width of the shoe, these nozzles moving inwardly to a greater extent when the shoe is wider and to a lesser extent when the shoe is narrower. It will be understood that the bottom of a shoe becomes progressively narrow from the breastline forwardly to the ball portion. Hence, during the operation of the machine, because of the action of the wedge blocks, the tacks which are driven through the tack nozzles will be located progressively closer to the edge of the shoe bottom as the lasting operation proceeds from breastline to ball portion. The purposes of this variation in the tack line are as follows: First, it is desirable, because of the several layers of material adjacent to the breastline, i. e., upper, counter and lining, that the tacks be located a sufficient distance in from the edge of the bottom of the shoe to enter the insole. Secondly, since there are a lesser number of layers of upper material adjacent to the ball portion it is possible to drive the tacks closer to the edge of the shoe bottom and still have these tacks enter the insole. Finally, by locating the tacks closer to the edge of the shoe bottom, in the vicinity of the narrower ball portion, room will be left for the application of a shank piece when the excess lasting allowance of the upper is removed.

The tack drivers 712 are operated by means of compressed air which is admitted to each of the cylinders 704, above the piston 706, through an orifice 770, Fig. 17, which is connected to a hose 772, Fig. 1. These two hoses lead from a T-fitting 774 which is connected to a pipe 776 that extends upwardly from a valve 778, Fig. 2. This valve is connected to a suitable source of compressed air, not shown, by means of a pipe 780 and has an operating plunger 782. Carried by a disk 784, fast on the main drive shaft 50, is a roller 786 which travels in a circular path in line with a valve-operating lever 787 in front of the valve plunger 782, Fig. 19. Each time the main drive shaft 50 revolves, the valve plunger will be moved to the right, Fig. 2, by the action of the roller 786 on a projection 789 on the lever 787, so as to admit a blast of compressed air to the pipe 776 and thence, through hoses 772 to the space in cylinders 704 above the pistons 706, thereby causing these pistons and the drivers carried thereby to be projected downwardly to drive tacks from the nozzles 700. As will be seen in Fig. 21, the tacks are driven during a dwell in the movement of the wipers which occurs after these wipers have been operated.

Tacks are supplied to the tack tubes 722 and thence to the nozzles 700 in the following manner. Mounted on the machine frame 48, by means of a standard 790 is a raceway 792 which is associated with a tack pot, not shown, of conventional construction. This raceway is provided with two tack-feeding grooves 794, 796, Fig. 15, over which a cover 798 extends, Fig. 14. Slidable in a notch 800, which extends across the lower ends of these grooves, is a separator plate 802 provided with two tack-receiving notches 804, 806, Fig. 15, and extending downwardly, through the raceway, are two tack-receiving bores 808, 810, to which the tack tubes 722 are connected. The separator plate is held in place in the groove 800 by means of a leaf spring 812, and has a tack-receiving surface 814 that is inclined toward the bores 808, 810, Fig. 16. Connected to, and held against, one end of the separator plate, by means including a spring 816, is the upper end of a lever 818 which is pivotally mounted on the standard 790, Fig. 1. Carried by the opposite end of this lever is a cam roll 820 which is held in contact with a side cam 822, mounted on the main drive shaft 50, Fig. 19, by means of a coil spring 824, Fig. 1. This cam is so shaped that the separator plate is reciprocated once during each revolution of the main drive shaft, the separator plate moving first to the right, until the notches 804, 806 are in alinement with the raceway grooves 794, 796, and a stop pin 826 contacts the raceway 792, and then returning to the position shown in Fig. 15 where these notches are in line with the bores 808, 810 and another stop pin 828 contacts the raceway. As the separator plate is thus reciprocated, two tacks are picked up and moved into alinement with the bores 808, 810. As will be seen from Fig. 21, the positioning of the tacks in alinement with these bores occurs just as the valve plunger 782 is operated to admit compressed air to the pipe 776 for operating the drivers.

Figure 14:
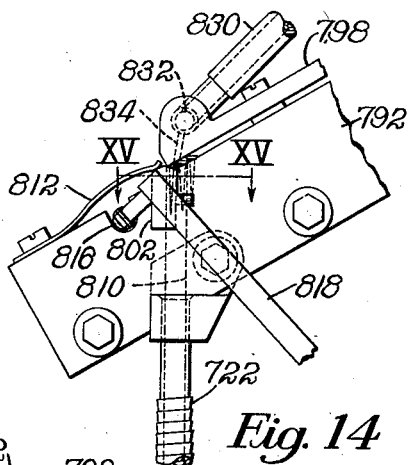
Fig. 14 is a view in side elevation of a portion of the tack-feeding and separating mechanism.
Figure 16:
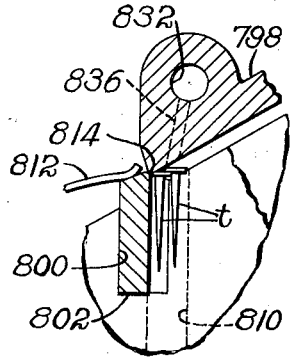
Fig. 16 is a view in section, substantially on line XVI—XVI of Fig. 15 and looking in the direction of the arrows.
Figure 15:
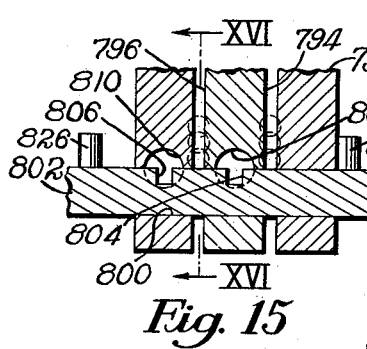
Fig. 15 is a view in section, substantially on line XV—XV of Fig. 14 and looking in the direction of the arrows.

The pipe 776 is also connected to a hose 830 which leads to a manifold 832, formed in the cover plate 798, Figs. 14 and 16. Extending downwardly from this manifold are two passageways 834, 836, Figs. 14 and 16, which are in line, respectively, with the bores 808, 810 in the raceway. Thus, concomitantly with the actuation of the drivers, by the admission of compressed air to the cylinders 704, through the hoses 772, blasts of compressed air will be emitted from the passageways 834, 836. These air blasts will first force the separated tacks off of the separator plate and into the bores 808, 810 and then blow these tacks downwardly along the tubes 722. By the time these tacks reach the passageways 720, in the heads 702, the driver passage 714 will be closed by the drivers 712, which have just been operated. However, as soon as these drivers are elevated, by their springs 716, and valve 778 has been closed, these tacks will drop into the tack nozzles 700, as indicated in Fig. 17. The throw of the cam 822 is greater than that required to operate the separator plate 802 and the extra movement available is taken up, in one direction by spring 816, and in the other direction by spring 824. These springs will also yield, to prevent damage to the parts, if movement of the separator plate is prevented, as, for example, by a jammed tack. The separator plate may be locked against movement, thereby discontinuing the feed of tacks to the tack nozzles, by means of a lever 840, having a finger 842, Fig. 1, which can be swung down alongside of the stop pin 828.

The operation of the machine

The functions of the several operating elements having been explained above, the operation of the machine as a whole will now be described. This machine is intended to be used for lasting along the opposite sides of a shoe, from the breastline to the ball portion. Thus, when presented to the machine, the shoe will have been breastline lasted, i. e., the counter will have been properly positioned, the upper and lining tensioned, and the upper, counter and lining tacked to the insole, adjacent to the breastline, and the upper materials in the vicinity of the ball portion will have been tensioned over the last and secured to the insole by tacks located adjacent to the ball portion of the shoe. With the rack bar 110 and drum 174 set for a selected size of shoe on a particular style of last, a shoe of this size and on that last is placed on the heel pin 66, with its forepart resting on the toe rest 60. Now, after the table 34 has been released, by depression of the treadle 134, the operator permits the shoe to be elevated, by the spring 124, under the control of the treadle rod 134, toward operating position. As the table rises, the operator centers the heel end of the shoe and swings its forepart around until the longitudinal median line, from breastline to ball portion, is substantially parallel to the direction of movement of the carriage 32, whereupon, he moves the carriage rearwardly, to bring the breastline of the shoe bottom into alinement with the operating elements of the machine, and then releases the treadle, to permit the shoe to be lifted up into engagement with the roller 46, thus releasing the edge gages 36 for inward movement toward engagement with the opposite sides of the shoe by the spring 520. As the carriage is thus moved rearwardly, the V-shaped abutment 376 comes into engagement with the shoe so as to center its heel end and urge the forepart of the shoe into engagement with the toe rest 60. The machine is now set into operation by depression of the starting treadle which is associated with the treadle rod 302.

During the first revolution of the main drive shaft 50, the carriage 32 is fed along, by the action of eccentric 212, pawl 200 and ratchet wheel 194, this initial feeding increment being equal to, or less than, the amount provided by one tooth of the ratchet wheel, depending on the position to which this wheel was turned when the carriage was moved along on the table 34 by the operator to aline the breastline with the operating elements. All subsequent feeding increments of the carriage will be the same and equal to that provided by one tooth of the ratchet wheel. Refering to Fig. 21, shortly after the main drive shaft begins to turn, the head 42 will be swung in a counterclockwise direction, Fig. 10, by the pawl 460 and spring 456, under the control of cam 458, to level the operating surfaces of the wipers 38, with respect to the bottom of the shoe, and the tack-separating plate 802 will start to move to the right, Fig. 15, to pick up two tacks from the raceways 794, 796. As the shoe is thus moved along, relatively to the operating elements, the table is elevated, under the influence of the spring 124, to hold the bottom of the shoe yieldingly in contact with the rollers 44, 46 and the edge gages 36 are held in engagement with the opposite sides of the shoe by the relatively light spring 520. The feeding movement of the shoe is completed when the main drive shaft has rotated 180° and, just before this happens, the wiper cams 240, 682, begin to move the blocks 646 inwardly. The full amount of movement imparted to these blocks by the throw of cam tracks 674, 680, Fig. 3, is approximately ¾ of an inch, the first ¼ of an inch of which is required to release the pawls 648, Fig. 8, and move the wipers 38 into a position where their leading edges are in line with the inner ends of the lips 500 on the edge gages. By the time the wipers have moved to these positions, the table 34 will be locked against downward movement, by the action of cam 407, spring 398 and lever 394; the head 42 will be locked in leveled position, as a result of the initial movement of the lever 496 and the action of spring 492 and bell-crank lever 486, and the edge gages will be locked, by the action of cams 564 and locking plates 554.

As the wiper slides 632 and wipers 38 continue their inward movements, the lasting margin M of the upper, on the opposite sides of the shoe, is wiped in over, and pressed firmly against, the bottom of the shoe and the tacking nozzles 700 are positioned, relatively to the opposite marginal edges of the shoe bottom, by the actions of the wedge blocks 742, stop fingers 732 and edge gages 36. Just as the wipers complete their inward movements, the air valve 778 is opened, by the action of the roll 786, and the separator plate 802 is returned to the position shown in Fig. 15 with its load of two tacks. The blasts of compressed air thus admitted to the hoses 772, 830 now operate the drivers 712 to drive the two tacks, previously separated and delivered to the nozzles, through the overlasted margin M of the upper and into the insole I, and blow another set of tacks down through the tack tubes 722. The cam tracks 674, 680 are provided with dwells, so that the wipers are held stationary when the tacks are being driven. After this tacking dwell, the main shaft finishes its first revolution, during which the feed eccentric 212 and blocks 646 are returned to their starting positions, thereby unlocking the head 42, and the table 34 is unlocked by cam 407, thus completing an operating cycle of the machine. Prior to the tacking dwell, and while the wipers are still moving inwardly, the edge gages are unlocked, by the action of the cams 564, for a purpose that will presently be explained. The several actions just described are repeated during the second half of each operating cycle and these operating cycles are continued until the machine is brought to a stop by the engagement of the projection 340 on the rack bar 110 with the arm 288, thereby disconnecting the main drive shaft from the pulley 52. At the conclusion of the lasting operation, the operator returns the table 34 and carriage 32 to the unloading position shown in Figs. 1 and 2 in which the latch 126 is caught over the pin 130. As the table is thus lowered, cam 578, Fig. 12, will be connected to the pulley 52 and rotated a single turn during which the edge gages are retracted and latched in the positions shown in Fig. 5 by the latch bar 522.

During that portion of each operating cycle when the shoe is being fed along, the head 42 is moved to a position to level the operating surfaces of the wipers, longitudinally of the shoe bottom, by the action of the pawl 460 and, as the conical portions 428 of the roller 44 bear against the overlasted margin of the upper, at each side of the shoe bottom, see Fig. 6, the shoe will be leveled, in a transverse direction, by the rocking movement of the cradle 30. Also, the edge gages 36 will be moved inwardly against the opposite edges of the shoe bottom by the action of the relatively light spring 520, arms 510 and equalizing gears 516. As suggested above, it may happen that one or the other of the edge gages will not be moved into contact with the side of the shoe, or at least that the edge gages will not be urged against the shoe with equal pressure, by the spring 520, because the bottom of the shoe, at the point of operation is not centered with respect to the edge gages. This condition will arise as a result of the improper positioning of the shoe with its longitudinal median line, between the breastline and ball portion, out of parallelism with the direction of movement of the carriage and also because of the unsymmetrical contours of the opposite sides of the shoe bottom. In the vicinity of the breastline, however, centering of the shoe is assured by the action of the V-shaped abutment 376 and the symmetrical shape of the shoe bottom in this location so that the aforementioned uncentered condition is encountered, progressively, as the lasting operation proceeds from breastline toward ball portion. Hence, for each feeding increment, this discrepancy is relatively small and is readily accommodated by the lost motion of the edge gages provided by the slots 514 in the arms 510, Fig. 7.

As already explained, when the wiper slides 632 start to move inwardly, the spring-pressed plungers 636 will exert forces on the edge gages tending to bring them both into contact with the opposite sides of the shoe bottom and to cause them to bear with equal pressure on the shoe, as a result of relative movement of the edge gages and by a slight shifting of the forepart of the shoe on the toe rest 60, as the shoe rotates about the heel pin 66. Referring to Fig. 21, this readjustment of the edge gages and repositioning of the shoe occurs during the first ¼ inch of inward movement of the wiper slides and wipers, whereupon the edge gages are locked to hold the shoe firmly against lateral displacement. The edge gages are thus locked while the wipers move inwardly another ¼ inch and then are unlocked during the completion of the action of the wipers. Accordingly, the shoe is held positively against lateral displacement, by the inwardly moving wipers, as they initially engage the lasting margin M of the upper, at the opposite sides of the shoe, and start to lay the upper inwardly over the bottom of the shoe. However, by the time the wipers have moved inwardly over the shoe bottom ¼ of an inch, the severest part of the wiping action will have been completed. Accordingly, the edge gages may now be unlocked to permit a still further repositioning of the edge gages, as a result of the additional pressure exerted thereon by the spring-pressed plungers 636, as well as by the stop fingers 732, through the action of the spring-pressed plungers 762, Fig. 7, during the last ¼ inch of inward movement of the wipers. Thus, if the pressure initially exerted by the spring-pressed plungers 636 on the edge gages has been insufficient to bring the edges into the desired contact with the opposite edges of the shoe, as shown in Fig. 6, this will be done now, by the combined action of the plungers 636 and 762, thereby assuring a proper positioning of the tack nozzles relatively to the marginal edges of the insole I before the tacks are driven.

During the overlaying action of the wipers, the shoe is held rigidly against downward movement, by the locking lever 394, Fig. 3, and hence the full force of the downward pressure of the wipers, under the action of the compression springs 640, Fig. 7, is exerted on the upper materials, thereby assuring a superior wiping action. As shown in Fig. 6, the relatively thin lip portions 500 of the edge gages contact the upper, at the opposite sides of the shoe, substantially in line with the edge of the insole. Accordingly, since the operating surfaces of the wipers travel along the upper sides of these lips, a sharp and well-defined feather line is obtained. Moreover, because of the automatic variation in the positioning of the tack nozzles, as the lasting operation proceeds from breastline to ball portion, the lasting tacks will be placed in the most favorable locations with respect to the marginal edge of the insole. As explained above, as shoes of different sizes are placed on the cradle 30, the machine is set to accommodate that particular size of shoe merely by a simple adjustment of the rack bar 110 by means of the hand knob 160 and index drum 174, and an equally simple adjustment is all that is required to reset the machine to handle shoes on lasts of different styles. Thus, an effective and positive lasting action is provided and an exceptionally high output rate is obtained with a minimum amount of operator skill and labor.

Having described the invention, what I claim as new and desire to secure by Letters Patent of the United States is:

1. A lasting machine having lasting devices arranged to operate on the opposite sides of a shoe, successively, in different locations as the shoe is moved along, relatively to said devices, a movable shoe support, feed mechanism for effecting intermittent movement of said support to present different portions of the shoe, successively, to the action of said devices, a member associated with said support and arranged to cooperate with the feed mechanism for discontinuing such movements of the support at a predetermined point along the bottom of the shoe, and means for adjusting said member, relatively to said support, to accommodate shoes of different sizes and styles.

2. A lasting machine having lasting devices arranged to operate on the opposite sides of a shoe, successively, in different locations as the shoe is fed along, relatively to said devices, a movable shoe support, feed mechanism for moving the support, intermittently, to feed the shoe and present different portions thereof, successively, to the action of said devices, power means for operating said devices and said feed mechanism, a member associated with the shoe support and arranged to cooperate with the power means for discontinuing the movements of the support and the operation of said devices, when the lasting operation has proceeded to a predetermined point along the bottom of a shoe mounted on said support, and means for adjusting said member, relatively to said support, to accommodate shoes of different sizes and styles.

3. A lasting machine having lasting devices arranged to operate on the opposite sides of a shoe, successively, in different locations as the shoe is fed along, relatively to said devices, a movable shoe support, feed mechanism for moving the support, intermittently, to feed the shoe and present different portions thereof, successively, to the action of said devices, power means for operating said devices and said feed mechanism, a rack bar associated with the shoe support and arranged to cooperate with the power means for discontinuing the movements of the support and the operation of said lasting devices, when the lasting operation has proceeded to a predetermined point along the bottom of a shoe mounted on said support, and means for adjusting said rack bar, relatively to said support, to accommodate shoes of different sizes and styles.

4. A lasting machine having lasting devices arranged to operate on the opposite sides of a shoe, successively, in different locations as the shoe is moved along, step by step relatively to said devices, a shoe support comprising a table and a carriage slidable thereon, a rack bar carried by said carriage, feed mechanism, including a pinion in mesh with said rack bar, power means for driving said pinion and operating said devices, a member, located in the path of movement of said rack bar and arranged to discontinue the operation of said devices and the feeding movements of said carriage, at a predetermined point along the bottom of a shoe mounted on the carriage, when engaged by said rack bar, and means associated with the carriage for adjusting the rack bar, relatively to the carriage, to accommodate shoes of different sizes and styles.

5. A lasting machine having lasting devices arranged to operate on the opposite sides of a shoe, successively, in different locations as the shoe is fed along between said devices, a shoe support including a carriage movable to effect feeding of a shoe thereon between said devices, a heel pin and toe rest on said carriage, said heel pin being shiftable to center the heel end of the shoe with respect to said devices, and means associated with said carriage and adapted to be moved into engagement with the heel end of a shoe mounted on said heel pin, for centering the heel end of the shoe.

6. A lasting machine having lasting devices arranged to operate on the opposite sides of a shoe, successively, in different locations as the shoe is fed along between said devices, a shoe support including a carriage movable initially to position a shoe thereon with respect to said lasting devices and, thereafter, to effect a feeding of the shoe, relatively to said devices, a heel pin and toe rest on said carriage, the heel pin being mounted for movement, laterally of the shoe, to center the heel end of the shoe with respect to said devices, and means associated with the carriage and arranged to be brought into engagement with the heel end of a shoe mounted on the heel pin for moving the shoe and heel pin laterally, to center the heel end of the shoe, in response to initial movement of the carriage to position the shoe with respect to said devices.

7. A lasting machine having lasting devices arranged to operate on the opposite sides of a shoe, successively, in different locations as the shoe is fed along between said devices, a shoe support including a carriage movable initially to position a shoe thereon with respect to said devices and, thereafter, to effect a feeding of the shoe, relatively to said devices, a heel pin and toe rest on said carriage, the heel pin being mounted for movement, laterally of the shoe, to center the heel end of the shoe with respect to said devices, and angularly, to urge the forepart of the shoe into contact with the toe rest, and means associated with the carriage and arranged to be brought into engagement with the heel end of a shoe mounted on the heel pin for moving the shoe and heel pin laterally, to center the heel end of the shoe, and for swinging the heel pin angularly, to urge the forepart of the shoe into contact with the toe rest, in response to the initial movement of the carriage to position the shoe with respect to said devices.

8. A lasting machine having lasting devices arranged to operate on the opposite sides of a shoe, successively, in different locations as the shoe is fed along between said devices, a shoe support comprising a table and a carriage slidable thereon, mechanism for effecting intermittent feeding movements of the carriage on the table, to present different portions of the shoe, successively, to the action of said devices, said table being movable, yieldingly, to hold the shoe in operative position, relatively to said devices, manual means for moving the table to withdraw the shoe from operative position, and means operating in time relation to the action of said feeding mechanism for locking said table against movement, during the operation of said devices.

9. A lasting machine having lasting devices arranged to operate on the opposite sides of a shoe, successively, in different locations as the shoe is fed along between said devices, a shoe support comprising a table and a carriage slidable thereon, mechanism for effecting feeding movements of the carriage on the table, to present different portions of the shoe, successively, to the action of said devices, said table being mounted for movement toward and away from said lasting devices, spring means for urging the table toward said devices, manual means for moving the table away from said devices, against the resistance of said spring means, and means operating in time relation to the action of said lasting devices for locking the table against movement, during the operation of said devices, and for releasing the table to the action of said spring means, during the operation of said feeding mechanism.

10. A lasting machine having lasting devices arranged to operate on the opposite sides of a shoe, successively, in different locations as the shoe is fed along between said devices, a shoe support comprising a table and a carriage slidable thereon, mechanism for effecting feeding movements of the carriage on the table, to present different portions of the shoe, successively, to the action of said devices, said table being mounted for movement toward and away from said lasting devices, spring means for urging the table toward said devices, means including a treadle rod for moving the table away from said devices, against the resistance of said spring means, and means associated with said treadle rod and operating in time relation to the action of said lasting devices for locking the table against movement, during the operation of the lasting devices, and for releasing the table to the action of said spring means, during the operation of said feeding mechanism.

11. A lasting machine having lasting devices arranged to operate on the opposite sides of a shoe, successively, in different locations as the shoe is fed along between said devices, a shoe support comprising a table and a carriage slidable thereon, mechanism for effecting intermittent feeding movements of the carriage and the table, to present different portions of the shoe, successively, to the action of said devices, means for selectively connecting the feeding mechanism to, or disconnecting it from, the carriage, said table being mounted for movement toward and away from said lasting devices, spring means for urging the table toward said devices, manual means for moving said table away from said devices, against the resistance of said spring means, and for operating said connecting and disconnecting means, said manual means being directly connected with said connecting and disconnecting means and having a lost motion connection with said table permitting relative movement between the manual means and the table, to effect operation of said connecting and disconnecting means.

12. A lasting machine having lasting devices arranged to operate on the opposite sides of a shoe, successively, in different locations as the shoe is fed along between said devices, a shoe support comprising a table and a carriage slidable thereon, mechanism for effecting intermittent feeding movements of the carriage on the table, to present different portions of the shoe, successively, to the action of said lasting devices, means for selectively connecting the feeding means to, or disconnecting it from, the carriage, said table being mounted for movement toward and away from said lasting devices, spring means for urging the table toward said devices, and means including a treadle rod for moving said table away from said devices, against the action of said spring means, said treadle rod being directly connected with said connecting and disconnecting means and having a lost motion connection with said table permitting relative movement between the treadle rod and the table, to effect operation of said connecting and disconnecting means.

13. A lasting machine having lasting devices arranged to operate on the opposite sides of a shoe, successively, in different locations as the shoe is fed along, relatively to said devices, a shoe support including a movable carriage, and mechanism for effecting intermittent feeding movements of the carriage, in predetermined time relation to the operation of said devices, to present different portions of a shoe thereon, successively, to the action of said lasting devices, said lasting devices being mounted for pivotal movement, about an axis extending transversely across the bottom of the shoe, to position said devices with respect to the bottom of the shoe.

14. A lasting machine having lasting devices arranged to operate on the opposite sides of a shoe, successively, in different locations as the shoe is fed along, relatively to said devices, a shoe support including a movable carriage, mechanism for effecting intermittent feeding movement of the carriage, in predetermined time relation to the operation of said devices, to present different portions of a shoe thereon, successively, to the action of said lasting devices, said lasting devices being mounted for pivotal movement, about an axis extending transversely across the bottom of the shoe, to position said devices with relation to the bottom of the shoe, and means for effecting such pivotal movement of said devices, during the feeding movements of said carriage.

15. A lasting machine having lasting devices arranged to operate on the opposite sides of a shoe, successively, in different locations as the shoe is fed along, relatively to said devices, a shoe support including a table and a carriage slidable thereon, feed mechanism for effecting intermittent feeding movements of said carriage, in predetermined time relation to the operation of said devices, to present different portions of the shoe mounted on the carriage, successively, to the operation of the lasting devices, said lasting devices being mounted for pivotal movement, about an axis extending transversely of the shoe, to position the lasting devices with relation to the bottom of the shoe, and means for effecting such pivotal movement of said devices, during the feeding movements of said carriage.

16. A lasting machine having lasting devices arranged to operate on the opposite sides of a shoe, successively, in different locations as the shoe is fed along, relatively to said devices, a shoe support including a table and a carriage slidable thereon, feed mechanism for effecting intermittent feeding movements of said carriage, in predetermined time relation to the operation of said devices, to present different portions of the shoe mounted on the carriage, successively, to the operation of the lasting devices, said devices being mounted for pivotal movement, about an axis extending transversely across the bottom of the shoe, to position the lasting devices with relation to the bottom of the shoe, means for effecting such pivotal movement of said devices, during the feeding movements of said carriage, and additional means for locking said devices against pivotal movement, when they are operating.

17. A lasting machine having lasting devices including a pair of edge gages and a pair of wipers arranged, respectively, to engage the opposite marginal edges of the bottom of a shoe and to lay the lasting margin of the upper materials in over, and to press them against the shoe bottom at the opposite sides of the shoe, successively, in different locations as the shoe is fed along relatively thereto, said edge gages and wipers being carried by a member that is mounted for pivotal movement, about an axis transverse to the bottom of the shoe being lasted, and on which there is supported a roll for engaging the bottom of the shoe, to determine its heightwise position with respect to said wipers, a shoe support comprising a table and a carriage slidable thereon, feed mechanism for effecting intermittent feeding movements of the carriage, in predetermined time relation to the operation of said wipers, to present different portions of the upper materials, successively, to the action of said wipers, and means for producing pivotal movement of said member, carrying the edge gages and the wipers, during the feeding movements of the carriage, to level operating surfaces on the wipers with relation to the shoe bottom.

18. A lasting machine having lasting devices including a pair of edge gages and a pair of wipers arranged, respectively, to engage the opposite marginal edges of the bottom of a shoe and to lay the lasting margin of the upper materials in over, and to press them against the shoe bottom at the opposite sides of the shoe, successively, in different locations as the shoe is fed along relatively thereto, said edge gages and wipers being carried by a member that is mounted for pivotal movement, about an axis transverse to the bottom of the shoe being lasted, and on which there is supported a roll for engaging the bottom of the shoe to determine its heightwise position with respect to said wipers, a shoe support comprising a table and a carriage slidable thereon, feed mechanism for effecting intermittent feeding movements of the carriage, in predetermined time relation to the operation of said wipers, to present different portions of the upper materials, successively, to the action of said wipers, means for producing pivotal movement of said member, carrying the edge gages and wipers, during the feeding movements of the carriage, to level operating surfaces on the wipers with relation to the shoe bottom, and means for locking said member against pivotal movement, during the operation of said wipers.

19. A lasting machine having lasting devices including a pair of edge gages and a pair of wipers arranged, respectively, to engage the opposite marginal edges of the bottom of a shoe and to lay the lasting margins of the upper materials in over, and to press them against the shoe bottom at the opposite sides of the shoe, successively, in different locations as the shoe is fed along, relatively to said devices, said edge gages and wipers being carried by a head member that is mounted for pivotal movement, about an axis transverse to the bottom of the shoe being lasted, and on which there is supported a roll for engaging the bottom of the shoe to position it heightwise with respect to said lasting devices, a shoe support comprising a table and carriage slidable thereon, said table being mounted for movement in a heightwise direction, under the influence of a spring, to hold the bottom of a shoe on the carriage, yieldingly, in engagement with said positioning roll, feed mechanism for effecting intermittent feeding movements of the carriage, in predetermined time relation to the operation of said wipers, to present different portions of the upper materials, successively, to the action of said wipers, and means for producing such pivotal movements of the head member, during the feeding movements of the carriage, to level operating surfaces on the wipers, with relation to the shoe bottom.

20. A lasting machine having lasting devices including a pair of edge gages and a pair of wipers arranged, respectively, to engage the opposite marginal edges of the bottom of a shoe and to lay the lasting margins of the upper materials in over, and to press them against, the shoe bottom at the opposite sides of the shoe, successively, in different locations as the shoe is fed along, relatively to said devices, said edge gages and wipers being carried by a head member that is mounted for pivotal movement, about an axis transverse to the bottom of the shoe being lasted, and on which there is supported a roll for engaging the bottom of the shoe to position it heightwise with respect to said lasting devices, a shoe support comprising a table and carriage slidable thereon, said table being mounted for movement in a heightwise direction, under the influence of a spring, to hold the bottom of a shoe on the carriage, yieldingly, in engagement with said positioning roll, feed mechanism for effecting intermittent feeding movements of the carriage, in predetermined time relation to the operation of said wipers, to present different portions of the upper materials, successively, to the action of said wipers, means for producing such pivotal movements of the head member, during the feeding movements of the carriage, to level operating surfaces on the wipers, with relation to the shoe bottom, and means for locking said head member against pivotal movement, during the operation of said wipers.

21. A lasting machine having lasting devices arranged to operate on the opposite sides of a shoe, successively, in different locations as the shoe is fed along, relatively to said devices, a shoe support including a movable carriage, mechanism for effecting intermittent feeding movements of the carriage, in predetermined time relation to the operation of said devices, to present different portions of a shoe thereon, successively, to the action of said devices, said lasting devices being carried by a head member that is mounted for pivotal movement, about an axis transverse to the bottom of a shoe on said carriage, and on which there are supported two rolls, one of which is adapted to contact the bottom of the shoe in the vicinity of said pivotal axis while the other is arranged to engage the shoe bottom in a location spaced, in a direction lengthwise of the shoe, from said axis, and means, operating during the feeding movements of the carriage, for swinging the head member, about its pivotal axis and the point of contact of the first-mentioned roll, in a direction to bring the second roll into engagement with the bottom of the shoe, to position the lasting devices with respect to the shoe bottom at the point of operation of said devices.

22. A lasting machine having lasting devices arranged to operate on the opposite sides of a shoe, successively, in different locations as the shoe is fed along, relatively to said devices, a shoe support including a movable carriage, mechanism for effecting intermittent feeding movements of the carriage, in predetermined time relation to the operation of said devices, to present different portions of a shoe thereon, successively, to the action of said devices, said lasting devices being carried by a head member that is mounted for pivotal movement, about an axis transverse to the bottom of a shoe on said carriage, and on which there are supported two rolls, one of which is adapted to contact the bottom of the shoe in the vicinity of said pivotal axis while the other is arranged to engage the shoe bottom in a location spaced, in a direction lengthwise of the shoe, from said axis, means, operating during the feeding movements of said carriage, for swinging the head member, about its pivotal axis and the point of contact of the first-named roll, in a direction to bring the second roll into engagement with the bottom of the shoe, to position the lasting devices with respect to the shoe bottom at the point of operation of said devices, and means for locking the head member against pivotal movement, during the operation of said lasting devices.

23. A lasting machine having lasting devices including a pair of edge gages and a pair of wipers arranged, respectively, to engage the opposite marginal edges of the bottom of a shoe and to lay the lasting margin of the upper materials in over, and to press them against, the shoe bottom at the opposite sides of the shoe, successively, in different locations as the shoe is fed along, relatively to said devices, a shoe support comprising a table and a carriage movable thereon, mechanism for effecting intermittent feeding movements of the carriage, in predetermined time relation to the operation of said wipers, to present different portions of the upper materials, successively, to the action of said wipers, said lasting devices being carried by a head member that is mounted for pivotal movement about an axis extending across the bottom of a shoe on said carriage, and on which there are supported two rolls, one of which is adapted to contact the bottom of the shoe in the vicinity of said pivotal axis while the other is arranged to engage the shoe bottom in a location spaced, in a direction lengthwise of the shoe, from said axis, and means, operating during the feeding movements of said carriage, for swinging the head member about its pivotal axis and the point of contact of the first-named roll, in a direction to bring the second roll, yieldingly, into engagement with the bottom of the shoe, to level operating surfaces on the wipers with respect to the shoe bottom.

24. A lasting machine having lasting devices including a pair of edge gages and a pair of wipers arranged, respectively, to engage the opposite marginal edges of the bottom of a shoe and to lay the lasting margin of the upper materials in over, and to press them against the shoe bottom at the opposite sides of the shoe, successively, in different locations as the shoe is fed along, relatively to said devices, a shoe support comprising a table and a carriage movable thereon, mechanism for effecting intermittent feeding movements of the carriage, in predetermined time relation to the operation of said wipers, to present different portions of the upper materials, successively, to the action of said wipers, said lasting devices being carried by a head member that is mounted for pivotal movement about an axis extending across the bottom of a shoe on said carriage, and on which there are supported two rolls, one of which is adapted to contact the bottom of the shoe in the vicinity of said pivotal axis while the other is arranged to engage the shoe bottom in a location spaced, in a direction lengthwise of the shoe, from said axis, means, operating during the feeding movements of said carriage for swinging the head member, about its pivotal axis and the point of contact of the first-named roll, in a direction to bring the second roll, yieldingly, into engagement with the bottom of the shoe, to level operating surfaces on the wipers with respect to the shoe bottom, and means for locking said head against pivotal movement, during the operation of said wipers.

25. A lasting machine having a pair of lasting devices for operating, respectively, on the opposite sides of a shoe, successively, in different locations as the shoe is fed along relatively to said devices, a pair of edge gages associated with said lasting devices and arranged to engage the marginal edge of the bottom of a shoe on the opposite sides thereof, a shoe support comprising a table and a carriage slidable thereon, mechanism for effecting intermittent feeding movements of the carriage, in predetermined time relation to the operation of said lasting devices, to present different portions of a shoe on the carriage, successively, to the operation of said devices, and spring means for holding the edge gages, yieldingly, in contact with the marginal edge of the shoe bottom, at the opposite sides of the shoe, during the feeding movements of said carriage.

26. A lasting machine having a pair of lasting devices for operating, respectively, on the opposite sides of a shoe, successively, in different locations as the shoe is fed along relatively to said devices, a pair of edge gages associated with said lasting devices and arranged to engage the marginal edge of the bottom of a shoe on the opposite sides thereof, a shoe support comprising a table and a carriage slidable thereon, mechanism for effecting intermittent feeding movements of the carriage, in predetermined time relation to the operation of said lasting devices, to present different portions of a shoe on the carriage, successively, to the operation of said devices, spring means for holding the edge gages, yieldingly, in contact with the marginal edge of the shoe bottom, at the opposite sides of the shoe, during the feeding movements of the carriage, and means, operating in time relation to the action of said lasting devices, for locking the edge gages.

27. A lasting machine having a pair of lasting devices for operating, respectively, on the opposite sides of a shoe, successively, in different locations as the shoe is fed along relatively to said devices, said lasting devices each including a wiper for laying the lasting margin of the upper materials in over, and for pressing it against, the shoe bottom, and an edge gage for engaging the marginal edge of the shoe bottom, adjacent to the location where the wiper acts, a shoe support comprising a table and a carriage slidable thereon, mechanism for effecting intermittent feeding movements of the carriage, in predetermined time relation to the operation of said wipers, to present different portions of the upper materials at the opposite sides of the shoe, successively, to the action of said wipers, power means for operating said wipers and said feed mechanism, and spring means for holding the edge gages, yieldingly, in contact with the marginal edge of the shoe bottom, at the opposite sides of the shoe, during the feeding movements of said carriage.

28. A lasting machine having a pair of lasting devices for operating, respectively, on the opposite sides of a shoe, successively, in different locations as the shoe is fed along relatively to said devices, said lasting devices each including a wiper for laying the lasting margin of the upper materials in over, and for pressing it against, the shoe bottom, and an edge gage for engaging the marginal edge of the shoe bottom, adjacent to the location where the wiper acts, a shoe support comprising a table and a carriage slidable thereon, mechanism for effecting intermittent feeding movements of the carriage, in predetermined time relation to the operation of said wipers, to present different portions of the upper materials at the opposite sides of the shoe, successively, to the action of said wipers, power means for operating said wipers and said feed mechanism, spring means for holding the edge gages, yieldingly, in contact with the marginal edge of the shoe bottom, at the opposite sides of the shoe, during the feeding movements of said carriage, and means actuated by the power means and operating in predetermined time relation to the action of said wipers for locking the edge gages, to hold the shoe against lateral displacement by said wipers.

29. A lasting machine having a pair of lasting devices for operating, respectively, on the opposite sides of a shoe, successively, in different locations as the shoe is fed along relatively to said devices, said lasting devices each including a wiper for laying the lasting margin of the upper materials in over, and for pressing it against, the shoe bottom, and an edge gage for engaging the marginal edge of the shoe bottom, adjacent to the location where the wiper acts, a shoe support comprising a table and a carriage slidable thereon, mechanism for effecting intermittent feeding movements of the carriage, in predetermined time relation to the operation of said wipers, to present different portions of the upper materials, at the opposite sides of the shoe, to the action of said wipers, power means for operating said wipers and said feed mechanism, spring means for holding the edge gages, yieldingly in contact with the marginal edge of the shoe bottom, at the opposite sides of the shoe, during the feeding movement of said carriage, and additional spring means, interposed between each wiper and its associated edge gage, operable to increase the pressure of said edge gages on the shoe, during the operation of said wipers.

30. A lasting machine having a pair of lasting devices for operating respectively, on the opposite sides of a shoe, successively, in different locations as the shoe is fed along relatively to said devices, said lasting devices each including a wiper for laying the lasting margin of the upper materials in over, and for pressing it against, the shoe bottom, and an edge gage for engaging the marginal edge of the shoe bottom, adjacent to the location where the wiper acts, a shoe support comprising a table and a carriage slidable thereon, mechanism for effecting intermittent feeding movements of the carriage, in predetermined time relation to the operation of said wipers, to present different portions of the upper materials, at the opposite sides of the shoe, to the action of said wipers, power means for operating said wipers and said feed mechanism, spring means for holding the edge gages, yieldingly in contact with the marginal edge of the shoe bottom, at the opposite sides of the shoe, during the feeding movement of said carriage, additional spring means, interposed between each wiper and its associated edge gage, operable to increase the pressure of said edge gages on the shoe, during the operation of said wipers, and means actuated by said power means, and in predetermined time relation to the action of said wipers, for locking the edge gages to hold the shoe against lateral displacement by said wipers.

31. A lasting machine having a pair of lasting devices for operating, respectively, on the opposite sides of a shoe, successively, in different locations as the shoe is fed along relatively to said devices, said lasting devices each including a wiper for laying the lasting margin of the upper materials in over, and for pressing it against, the shoe bottom, and an edge gage for engaging the marginal edge of the shoe bottom, adjacent to the location where the wiper acts, a shoe support comprising a table and a carriage slidable thereon, mechanism for effecting intermittent feeding movements of the carriage, in predetermined time relation to the operation of said wipers, to present different portions of the upper materials, at the opposite sides of the shoe, to the action of said wipers, power means for effecting movement of said wipers, relatively to their associated edge gages, to cause the wipers to lay the lasting margin of the upper materials, at the opposite sides of the shoe, in over, and to press them against, the bottom of the shoe, spring means for holding the edge gages, yieldingly, in contact with the marginal edge of the shoe bottom at the opposite sides of the shoe, during the feeding movements of said carriage, and additional spring means interposed between each wiper and its associated edge gage, operable as a result of relative movement between the wipers and edge gages to increase the pressure of said edge gages on the shoe, during the operation of said wipers.

32. A lasting machine having a pair of lasting devices for operating, respectively, on the opposite sides of a shoe, successively, in different locations as the shoe is fed along relatively to said devices, said lasting devices each including a wiper for laying the lasting margin of the upper materials in over, and for pressing it against, the shoe bottom, and an edge gage for engaging the marginal edge of the shoe bottom, adjacent to the location where the wiper acts, a shoe support comprising a table and a carriage slidable thereon, mechanism for effecting intermittent feeding movements of the carriage, in predetermined time relation to the operation of said wipers, to present different portions of the upper materials, at the opposite sides of the shoe, to the action of said wipers, power means for effecting movement of said wipers, relatively to their associated edge gages, to cause the wipers to lay the lasting margin of the upper materials, at the opposite sides of the shoe, in over, and to press them against, the bottom of the shoe, spring means for holding the edge gages, yieldingly, in contact with the marginal edge of the shoe bottom at the opposite sides of the shoe, during the feeding movements of said carriage, additional spring means, interposed between each wiper and its associated edge gage, operable as a result of relative movement between the wipers and edge gages, to increase the pressure of said edge gages on the shoe, during the operation of said wipers, and means actuated by said power means in predetermined time relation to the movements of said wipers relatively to the edge gages for locking the edge gages, to hold the shoe against lateral displacement by said wipers.

33. A lasting machine having a pair of lasting devices for operating on the opposite sides of a shoe, successively, in different locations as the shoe is fed along relatively to said devices, an edge gage associated with each of said lasting devices, a movable shoe support, mechanism for effecting intermittent feeding movement of the support to present different portions of a shoe carried thereby, successively, to the action of said devices, said support being also movable, under the action of a spring to present a shoe thereon in operative position relatively to said devices, spring-operated means for moving the edge gages toward each other and into engagement with the opposite sides of a shoe, latch means for holding the edge gages separated and against movement by said spring means, means operable as a result of engagement by the bottom of a shoe on the support, when presented in operative position relatively to said devices, for releasing the latch means to cause the edge gages to be moved into, and held yieldingly in engagement with the marginal edges of the shoe bottom at the opposite sides of the shoe, during the operation of said feeding mechanism.

34. A lasting machine having a pair of lasting devices for operating on the opposite sides of a shoe, successively, in different locations as the shoe is fed along relatively to said devices, an edge gage associated with each of said lasting devices, a movable shoe support, mechanism for effecting intermittent feeding movement of the support to present different portions of a shoe carried thereby, successively, to the action of said devices, said support being also movable, under the action of a spring to present a shoe thereon in operative position relatively to said devices, manually operated means for moving the support to withdraw the shoe from operative position, spring-operated means for moving the edge gages toward each other and into engagement with the opposite sides of a shoe on the support, latch means for holding the edge gages separated and against movement by said spring-operated means, means operable as a result of engagement by the bottom of a shoe on the support, when presented in operative position relatively to said lasting devices, for releasing the latch means to cause the edge gages to be moved into, and held yieldingly in, engagement with the marginal edges of the shoe bottom at the opposite sides of the shoe, during the operation of said feeding mechanism, and means for withdrawing the edge gages from engagement with the shoe and into a position to be engaged by the latch means, as a result of movement of the support by said manual means to withdraw the shoe from operative position.

35. A lasting machine having a pair of lasting devices for operating on the opposite sides of a shoe, successively, in different locations as the shoe is fed along relatively to said devices, an edge gage associated with each of said lasting devices, a shoe support including a table and a carriage slidable thereon, mechanism for effecting intermittent feeding movements of the carriage to present different portions of the shoe, successively, to the action of said devices, power means for operating said devices and said feed mechanism, said table being mounted for movement toward and away from said devices, a spring for moving the table toward the devices, a treadle rod for moving the table away from said devices, spring-operated means for moving the edge gages toward each other and into engagement with the opposite sides of a shoe on the carriage, latch means for holding the edge gages separated and against movement by said spring-operated means, and means associated with said lasting devices and operable as a result of engagement by the bottom of a shoe on the carriage, when presented in operative position relatively to said devices, for releasing the latch means to cause the edge gages to be moved into, and held yieldingly in, engagement with the marginal edges of the shoe bottom at the opposite sides of the shoe, during the operation of said feed mechanism.

36. A lasting machine having a pair of lasting devices for operating on the opposite sides of a shoe, successively, in different locations as the shoe is fed along relatively to said devices, an edge gage associated with each of said lasting devices, a shoe support including a table and a carriage slidable thereon, mechanism for effecting intermtitent feeding movements of the carriage to present different portions of the shoe, successively, to the action of said devices, power means for operating said devices and said feed mechanism, said table being mounted for movement toward and away from said devices, a spring for moving the table toward the devices, a treadle rod for moving the table away from said devices, spring-operated means for moving the edge gages toward each other and into engagement with the opposite sides of a shoe on the carriage, latch means for holding the edge gages separated and against movement by said spring-operated means, means associated with said lasting devices and operable as a result of engagement by the bottom of a shoe on the carriage, when presented in operative position relatively to said devices, for releasing the latch means to cause the edge gages to be moved into, and held yieldingly in, engagement with the marginal edges of the shoe bottom at the opposite sides of the shoe, during the operation of said feed mechanism, and means operated by the power means for moving the edge gages away from the shoe and into position to be engaged by the latch means, as a result of movement of the table by the treadle rod to withdraw the shoe from operative position.

37. A lasting machine having a pair of lasting devices for operating on the opposite sides of a shoe, successively, in different locations as the shoe is fed along, relatively thereto, each of said lasting devices including a wiper for laying the lasting margin of the upper materials in over, and for pressing it against, the shoe bottom, and an edge gage for engaging the marginal edge of the shoe bottom, a shoe support comprising a movable carriage, mechanism for effecting intermittent feeding movements of the carriage, in predetermined time relation to the operation of said wipers, to present different portions of the upper materials, successively, to the action of the wipers, power means for operating the feed mechanism and the wipers, spring means form moving the edge gages toward and into engagement with the marginal edges of the shoe bottom at the opposite sides of the shoe, cooperating abutment means on the edge gages and the wipers arranged to cause the wipers to be carried inwardly with the edge gages, and clutch means associated with the wipers and the power means for connecting the wipers to the power means after they have been moved inwardly by said edge gages.

38. A lasting machine having a pair of lasting devices for operating on the opposite sides of a shoe, successively, in different locations as the shoe is fed along, relatively thereto, each of said lasting devices including a reciprocating wiper for laying the lasting margin of the upper materials in over, and for pressing it against the shoe bottom, and an edge gage for engaging the marginal edge of the shoe bottom, a shoe support comprising a movable carriage, mechanism for effecting intermittent feeding movements of the carriage, in predetermined time relation to the operation of said wipers, to present different portions of the upper materials, successively, to the action of the wipers, power means for operating the feed mechanism and for reciprocating the wipers, spring means for moving the edge gages toward and into engagement with the marginal edges of the shoe bottom, at the opposite sides of the shoe, cooperating abutment means on the edge gages and the wipers arranged to cause the wipers to be carried inwardly with the edge gages, and clutch means associated with the wipers and the power means for connecting the wipers to the power means, after they have been moved inwardly by said edge gages.

39. A lasting machine having a pair of lasting devices for operating on the opposite sides of a shoe, successively, in different locations as the shoe is fed along, step by step, relatively to said devices, each of said lasting devices including a reciprocating wiper for laying the lasting margin of the upper materials in over, and for pressing it against, the shoe bottom and an edge gage for engaging the marginal edge of the shoe bottom, a movable shoe support, mechanism for effecting intermittent feeding movements of said support, in predetermined time relation to the operation of said wipers, to present different portions of the upper materials, successively, to the action of said wipers, power-operated means for reciprocating the wipers including reciprocating members movable through strokes of predetermined linear extent, toward and away from a shoe on the carriage, clutch means for connecting said members to said wipers, during each reciprocating stroke of said members, spring means for moving the edge gages toward and into engagement with the opposite sides of the shoe, cooperating abutment means on the edge gages and wipers arranged to cause the wipers to be carried inwardly by the edge gages, as the edge gages are moved into engagement with the opposite sides of the shoe by said spring means, control means operable as a result of movement of the reciprocating members, for connecting said members to the wipers, at the beginning of each reciprocating stroke toward the shoe, and for disconnecting said members from the wipers, at the conclusion of each reciprocating stroke away from the shoe, whereby reciprocating wiping strokes of predetermined linear extent are imparted to the wipers.

40. A lasting machine having a pair of lasting devices for operating on the opposite sides of a shoe, successively, in different locations as the shoe is fed along, step by step, relatively to said devices, each of said lasting devices including a reciprocating wiper for laying the lasting margin of the upper materials in over, and for pressing it against, the shoe bottom and an edge gage for engaging the marginal edge of the shoe bottom, a movable shoe support, mechanism for effecting intermittent feeding movements of said support, in predetermined time relation to the operation of said wipers, to present different portions of the upper materials, successively, to the action of said wipers, power-operated means for reciprocating the wipers including reciprocating members movable through strokes of predetermined linear extent, toward and away from a shoe on the support, clutch means including pawls carried by said reciprocating members and ratchet teeth associated with the wipers for connecting said reciprocating members to the wipers, during each reciprocating stroke of said members, spring means for moving the edge gages toward and into engagement with the opposite sides of the shoe, cooperating abutment means on the edge gages and wipers arranged to cause the wipers to be carried inwardly by the edge gages, as the edge gages are moved into engagement with the opposite sides of the shoe by said spring means, control means operable, as a result of movement of the reciprocating members, for connecting said members to the wipers, at the beginning of each reciprocating stroke toward the shoe, and for disconnecting said members from the wipers, at the conclusion of each reciprocating stroke away from the shoe, whereby reciprocating wiping strokes of predetermined linear extent are imparted to the wipers.

41. A lasting machine having a pair of lasting devices for operating on the opposite sides of a shoe, successively, in different locations as the shoe is fed along, step by step, relatively to said devices, each of said lasting devices including a wiper for laying the lasting margin of the upper materials in over, and for pressing it against, the shoe bottom and an edge gage for engaging the marginal edge of the shoe bottom, a movable shoe support, mechanism for effecting intermittent feeding movements of said support, in predetermined time relation to the operation of said wipers, to present different portions of the upper materials, successively, to the action of said wipers, a pair of wiper slides mounted for reciprocating movement, toward and away from the opposite sides of a shoe on the support, said wipers being pivotally mounted adjacent to the ends of these slides, and spring means associated with each of the wipers and wiper slides and arranged to cause the wipers to exert yielding pressure on the upper materials as the wipers lay the lasting margin of the upper materials in over, and press it against, the shoe bottom at the opposite sides of the shoe, during movement of the wiper slides toward the shoe.

42. A lasting machine having a pair of lasting devices for operating on the opposite sides of a shoe, successively, in different locations as the shoe is fed along, step by step, relatively to said devices, each of said lasting devices including a wiper for laying the lasting margin of the upper materials in over, and for pressing it against, the shoe bottom and an edge gage for engaging the marginal edge of the shoe bottom, a movable shoe support, mechanism for effecting intermittent feeding movements of said support, in predetermined time relation to the operation of said wipers, to present different portions of the upper materials, successively, to the action of said wipers, a pair of wiper slides mounted for reciprocating movement, toward and away from the opposite sides of a shoe on the support, said wipers being pivotally mounted adjacent to the ends of these slides, spring means associated with each of the wipers and wiper slides and arranged to cause the wipers to exert yielding pressure on the upper materials as the wipers lay the lasting margin of the upper materials in over, and press it against the shoe bottom at the opposite sides of the shoe, during movement of the wiper slides toward the shoe, and power-operated means for reciprocating said wiper slides in time relation to the action of said feed mechanism.

43. A lasting machine having a pair of lasting devices for operating on the opposite sides of a shoe, successively, in different locations as the shoe is fed along, step by step, relatively to said devices, each of said lasting devices including a wiper for laying the lasting margin of the upper materials in over, and for pressing it against, the shoe bottom and an edge gage for engaging the marginal edge of the shoe bottom, a movable shoe support, mechanism for effecting intermittent feeding movements of said support, in predetermined time relation to the operation of said wipers, to present different portions of the upper materials, successively, to the action of said wipers, said edge gages being supported for sliding movement toward the opposite sides of a shoe on the support, a pair of wiper slides mounted above the edge gages for reciprocating movement inwardly toward and outwardly away from the opposite sides of said shoe, relatively to said edge gages, said wipers being pivotally mounted adjacent to the inner ends of said wiper slides, and spring means associated with the wipers and the wiper slides and arranged to hold the operating surfaces of the wipers in contact with the edge gages, as the wiper slides are reciprocated to bring the wipers into engagement with the upper materials, at the opposite sides of the shoe, and thereafter to cause the wipers to exert yielding pressure on the upper materials as the wipers lay the lasting margin of the upper materials in over, and press it against, the bottom of the shoe.

44. A lasting machine having a pair of lasting devices for operating on the opposite sides of a shoe, successively, in different locations as the shoe is fed along, step by step, relatively to said devices, each of said lasting devices including a wiper for laying the lasting margin of the upper materials in over, and for pressing it against, the shoe bottom and an edge gage for engaging the marginal edge of the shoe bottom, a movable shoe support, mechanism for effecting intermittent feeding movements of said support, in predetermined time relation to the operation of said wipers, to present different portions of the upper materials, successively, to the action of said wipers, said edge gages being supported for sliding movement toward the opposite sides of a shoe on the support, a pair of wiper slides mounted above the edge gages for reciprocating movement inwardly toward and outwardly away from the opposite sides of said shoe, relatively to said edge gages, said wipers being pivotally mounted adjacent to the inner ends of said wiper slides, spring means associated with the wipers and the wiper slides and arranged to hold the operating surfaces of the wipers in contact with the edge gages, as the wiper slides are reciprocated to bring the wipers into engagement with the upper materials, at the opposite sides of the shoe, and thereafter to cause the wipers to exert yielding pressure on the upper materials as the wipers lay the lasting margin of the upper materials in over, and press it against the bottom of the shoe, and power-operated means for reciprocating said wiper slides in time relation to the action of said feed mechanism.

45. A lasting machine having a pair of lasting devices for operating on the opposite sides of a shoe, successively, in different locations as the shoe is supported and fed along, relatively thereto, each of said lasting devices including a nozzle, movable over the shoe bottom, for inserting fastenings in the overlasted margin of the upper materials and an edge gage for engaging the marginal edge of the shoe bottom, means for moving said edge gages toward each other and into engagement with the opposite sides of the shoe being lasted, yieldable means for moving said nozzles inwardly over the bottom of the shoe at the opposite sides thereof, abutment means carried by said edge gages and cooperating stop means associated with said nozzles for limiting inward movement of the nozzles by said yieldable means.

46. A lasting machine having a pair of lasting devices for operating on the opposite sides of a shoe, successively, in different locations as the shoe is supported and fed along relatively thereto, each of said lasting devices including a reciprocating wiper for laying the lasting margin of the upper materials in over, and for pressing it against, the shoe bottom, a nozzle, movable over the shoe bottom, for inserting fastenings in the overlasted margin of the upper materials and an edge gage for engaging the marginal edge of the shoe bottom, means for moving said edge gages toward each other and into engagement with the opposite sides of the shoe being lasted, yieldable means associated with the wipers for moving said nozzles inwardly over the bottom of the shoe at the opposite sides thereof, during the operation of said wipers, abutment means carried by said edge gages and cooperating stop means associated with said nozzles for limiting inward movement of the nozzles by said yieldable means.

47. A lasting machine having a pair of lasting devices for operating on the opposite sides of a shoe, successively, in different locations as the shoe is supported and fed along, relatively to said devices, each of said lasting devices including a reciprocating wiper for laying the lasting margin of the upper materials in over, and for pressing it against, the bottom of the shoe, a nozzle, movable over the shoe bottom, for inserting fastenings in the overlasted margin of the upper materials and an edge gage for engaging the marginal edge of the shoe bottom, means for moving said edge gages toward each other and into engagement with the opposite sides of the shoe being lasted, yieldable means associated with the wipers for moving said nozzles inwardly over the bottom of the shoe at the opposite sides thereof during the operation of said wipers, cooperating stop means associated with said nozzles and edge gages for limiting inward movement of the nozzles by said yieldable means, and means for varying the action of said cooperating stop means in accordance with the locations of said edge gages, when in engagement with the opposite sides of the shoe.

48. A lasting machine having a pair of lasting devices for operating on the opposite sides of a shoe, successively, in different locations as the shoe is supported and fed along, relatively to said devices, each of said lasting devices including a nozzle, movable over the shoe bottom, for inserting fastenings in the overlasted margin of the upper materials and an edge gage for engaging the marginal edge of the shoe bottom, means for moving the edge gages toward each other and into engagement with the opposite sides of the shoe being lasted, yieldable means for moving said nozzles inwardly over the bottom of the shoe, at the opposite sides thereof, abutments on each of said edge gages, stop fingers carried by said nozzles and adapted to engage the abutments on the edge gages and limit inward movement of the nozzles by said yieldable means, and means associated with said stop fingers and operable, in response to the inward movement of said nozzles by the yieldable means, for varying the positions of said stop fingers, relatively to the nozzles, in accordance with the locations of said edge gages, when in engagement wtih the opposite sides of the shoe.

49. A lasting machine having a pair of lasting devices for operating on the opposite sides of a shoe, successively, in different locations as the shoe is supported and fed along, relatively to said devices, each of said lasting devices including a reciprocating wiper for laying the lasting margin of the upper materials in over, and for pressing it against, the bottom of the shoe, a nozzle, movable over the shoe bottom, for inserting fastenings in the overlasted margin of the upper materials and an edge gage for engaging the marginal edge of the shoe bottom, means for moving the edge gages toward each other and into engagement with the opposite sides of the shoe being lasted, yieldable means associated with the wipers for moving said nozzles inwardly over the bottom of the shoe at the opposite sides thereof, during the operation of said wipers, abutments on each of said edge gages, stop fingers carried by said nozzles and adapted to engage the abutments on the edge gages to limit inward movement of the nozzles by said yieldable means, and means associated with said stop fingers and operable, in response to the inward movement of said nozzles by the yieldable means, for varying the positions of said stop fingers, relatively to the nozzles, in accordance with the locations of said edge gages, when in engagement with the opposite sides of the shoe.

CHARLES A. ROBINSON.

References Cited in the file of this patent

UNITED STATES PATENTS

| Number | Name | Date |
| --- | --- | --- |
| 880,401 | Pym | Feb. 25, 1908 |
| 907,524 | Pym | Dec. 22, 1908 |
| 1,901,167 | Jorgensen | Mar. 14, 1933 |
| 2,524,817 | Macdonald | Oct. 10, 1950 |